(12) United States Patent
Upadhyay et al.

(10) Patent No.: US 11,561,978 B2
(45) Date of Patent: Jan. 24, 2023

(54) INTELLIGENT CACHE MANAGEMENT FOR MOUNTED SNAPSHOTS BASED ON A BEHAVIOR MODEL

(71) Applicant: Commvault Systems, Inc., Tinton Falls, NJ (US)

(72) Inventors: Mrityunjay Upadhyay, Telengana (IN); Bhavyan Bharatkumar Mehta, Mumbai (IN); Anand Vibhor, Manalapan, NJ (US); Jagadeesh Narayanan Kallidaikurichi Swaminathan, Telangana (IN)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 17/381,026

(22) Filed: Jul. 20, 2021

(65) Prior Publication Data

US 2022/0414103 A1    Dec. 29, 2022

Related U.S. Application Data

(60) Provisional application No. 63/216,395, filed on Jun. 29, 2021.

(51) Int. Cl.
*G06F 16/2455* (2019.01)
*G06F 16/2457* (2019.01)
(Continued)

(52) U.S. Cl.
CPC .. *G06F 16/24552* (2019.01); *G06F 16/24575* (2019.01); *G06F 16/256* (2019.01); *G06N 20/00* (2019.01)

(58) Field of Classification Search
CPC ......... G06F 16/24552; G06F 16/24575; G06F 16/256; G06N 20/00
See application file for complete search history.

(56) References Cited

U.S. PATENT DOCUMENTS 4,084,231 A   4/1978 Capozzi et al.
4,267,568 A   5/1981 Dechant et al.
(Continued)

FOREIGN PATENT DOCUMENTS

EP   0259912   3/1988
EP   0405926   1/1991
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Jorge A Casanova
(74) *Attorney, Agent, or Firm* — Commvault Systems, Inc.

(57) ABSTRACT

A client computing device receives a behavior model corresponding to a user group associated with a user. The behavior model has been trained with monitored user interactions of one or more files associated with the user group. The client computing device further mounts a snapshot of a file and determines, based on the behavior model, which files of the mounted snapshot to transfer to a locally accessible cache. During use of the client computing device, the client computing device may determine whether the mounted snapshot is accessible. If the mounted snapshot is not accessible, the client computing device may selectively delete, based on the behavior model, one or more of the files stored in the locally accessible cache. If the mounted snapshot is accessible, the client computing device may update the one or more files of the locally accessible cache with monitored user interactions with the mounted snapshot.

20 Claims, 17 Drawing Sheets

(51) Int. Cl.
*G06F 16/25* (2019.01)
*G06N 20/00* (2019.01)

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,107,298 B2 | 9/2006 | Prahlad et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,246,207 B2 | 7/2007 | Kottomtharayil et al. | |
| 7,315,923 B2 | 1/2008 | Retnamma et al. | |
| 7,343,453 B2 | 3/2008 | Prahlad et al. | |
| 7,389,311 B1 | 6/2008 | Crescenti et al. | |
| 7,395,282 B1 | 7/2008 | Crescenti et al. | |
| 7,440,982 B2 | 10/2008 | Lu et al. | |
| 7,454,569 B2 | 11/2008 | Kavuri et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,734,669 B2 | 6/2010 | Kottomtharayil et al. | |
| 7,747,579 B2 | 6/2010 | Prahlad et al. | |
| 7,801,864 B2 | 9/2010 | Prahlad et al. | |
| 7,809,914 B2 | 10/2010 | Kottomtharayil et al. | |
| 8,156,086 B2 | 4/2012 | Lu et al. | |
| 8,170,995 B2 | 5/2012 | Prahlad et al. | |
| 8,229,954 B2 | 7/2012 | Kottomtharayil et al. | |
| 8,230,195 B2 | 7/2012 | Amarendran et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,578,120 B2 | 11/2013 | Attarde et al. | |
| 8,818,951 B1* | 8/2014 | Muntz | G06F 16/1827 707/639 |
| 8,954,446 B2 | 2/2015 | Retnamma | |
| 9,020,900 B2 | 4/2015 | Retnamma | |
| 9,098,495 B2 | 8/2015 | Gokhale | |
| 9,239,687 B2 | 1/2016 | Vijayan | |
| 9,633,033 B2 | 4/2017 | Vijayan et al. | |
| 9,639,274 B2 | 5/2017 | Maranna et al. | |
| 9,852,377 B1 | 12/2017 | Kumar | |
| 10,558,583 B1* | 2/2020 | Narasimhan | G06N 20/00 |
| 10,592,145 B2 | 3/2020 | Bedadala et al. | |
| 11,194,492 B2 | 12/2021 | Bedadala et al. | |
| 11,418,555 B1* | 8/2022 | Cafaro | G06F 16/11 |
| 2006/0224846 A1 | 10/2006 | Amarendran et al. | |
| 2007/0005914 A1* | 1/2007 | Thompson | G06F 11/1466 711/162 |
| 2008/0104032 A1* | 5/2008 | Sarkar | G06F 16/958 707/999.102 |
| 2009/0319534 A1 | 12/2009 | Gokhale | |
| 2010/0100604 A1* | 4/2010 | Fujiwara | G06F 12/0866 709/213 |
| 2012/0102564 A1* | 4/2012 | Schentrup | H04W 12/02 726/16 |
| 2012/0150818 A1 | 6/2012 | Vijayan Retnamma et al. | |
| 2012/0150826 A1 | 6/2012 | Vijayan Retnamma et al. | |
| 2014/0195466 A1 | 7/2014 | Phillipps et al. | |
| 2014/0201170 A1 | 7/2014 | Vijayan et al. | |
| 2015/0186076 A1* | 7/2015 | Andrews | G06F 12/084 711/113 |
| 2015/0379429 A1 | 12/2015 | Lee et al. | |
| 2016/0078245 A1 | 3/2016 | Amarendran et al. | |
| 2016/0139836 A1* | 5/2016 | Nallathambi | H04L 67/1097 711/114 |
| 2016/0191650 A1 | 6/2016 | Rong et al. | |
| 2016/0314046 A1* | 10/2016 | Kumarasamy | G06F 11/1435 |
| 2016/0350391 A1 | 12/2016 | Vijayan | |
| 2016/0358099 A1 | 12/2016 | Sturlaugson et al. | |
| 2017/0061329 A1 | 3/2017 | Kobayashi et al. | |
| 2017/0168903 A1 | 6/2017 | Dornemann | |
| 2017/0185488 A1 | 6/2017 | Kumarasamy et al. | |
| 2017/0192866 A1 | 7/2017 | Vijayan et al. | |
| 2017/0192981 A1* | 7/2017 | Glover | H04L 67/289 |
| 2017/0193003 A1 | 7/2017 | Vijayan et al. | |
| 2017/0193535 A1* | 7/2017 | Xu | H04L 67/1017 |
| 2017/0235647 A1 | 8/2017 | Kilaru et al. | |
| 2017/0242871 A1 | 8/2017 | Kilaru et al. | |
| 2017/0315917 A1* | 11/2017 | Yamamoto | G06F 12/0862 |
| 2018/0293377 A1 | 10/2018 | Tomonaga | |
| 2018/0329951 A1 | 11/2018 | Yu et al. | |
| 2019/0026048 A1 | 1/2019 | Muehge et al. | |
| 2019/0163763 A1* | 5/2019 | Pandey | G06F 11/301 |
| 2019/0250998 A1 | 8/2019 | Bedadala et al. | |
| 2021/0034738 A1* | 2/2021 | Wu | G06F 21/552 |
| 2021/0034995 A1* | 2/2021 | Gentric | H04L 67/568 |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: a Multi-Platform, Scalable, Back-up and Archive Mass Storage System," Digest of Papers, Compcon '95,

(56) References Cited

OTHER PUBLICATIONS

Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review SIGOPS, vol. 25, No. 5, May 1991, New York, US, pp. 1-15.

* cited by examiner

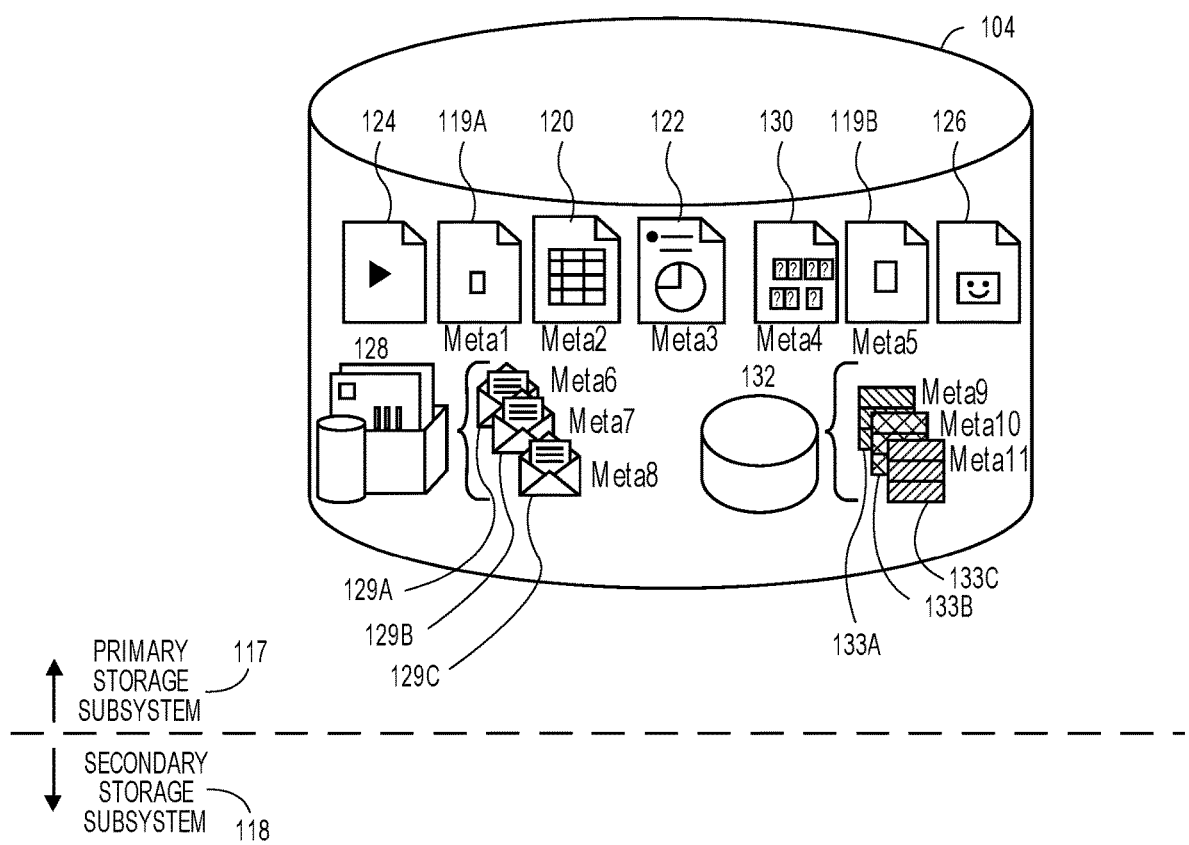
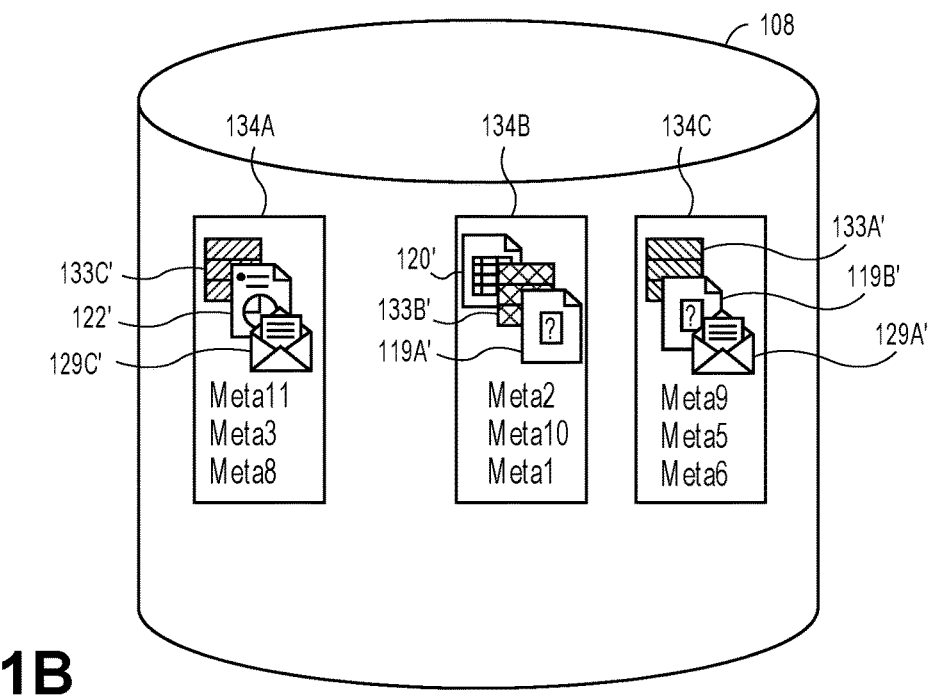
FIG. 1B

INTELLIGENT CACHE MANAGEMENT FOR MOUNTED SNAPSHOTS BASED ON A BEHAVIOR MODEL

CROSS-REFERENCE TO RELATED APPLICATIONS

This application claims the benefit of priority to U.S. Pat. App. No. 63/216,395, filed Jun. 29, 2021 and titled "INTELLIGENT CACHE MANAGEMENT FOR MOUNTED SNAPSHOTS BASED ON A BEHAVIOR MODEL," the disclosure of which is hereby incorporated by reference in its entirety.

Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that leverage their data. For instance, data analysis capabilities, information management, improved data presentation and access features, and the like, are in increasing demand.

A company may use various cloud technologies to provide online access to files by its employees using client computing devices. For example, a user (e.g., an employee of the company) working on a client computing device, such as a laptop computer, may access a file stored in the cloud, and perform operations on the file as if the file were stored locally on the client computing device. These operations are transparent to the user and the user may not be required to perform any special or extraordinary actions to complete these operations. By having the file stored in the cloud, the user may access the file from any location so long as the client computing device has connectivity to the cloud.

However, there may be instances where the user loses connectivity to the cloud and is unable to continue working on the file. Furthermore, the user may need the file to work on other files that are, in fact, locally stored on the client computing device. For example, the file stored in the cloud may be part of a library or larger repository and, without access to the file, the files that are local on the client computing device may be unable to function in their expected manner. This situation may be particularly prevalent in the software development community, where a library or other repository may be stored in the cloud, and multiple users may need access to the cloud library for developing software local on the client computing device.

SUMMARY

To address these and other deficiencies, this disclosure describes an information management system that leverages trained behavior models to determine which files in a file repository are likely to be used by one or more users of a particular user group, and then download selected one or more of the determined files to a client computing device associated with a user of the particular user group. In one embodiment, the information management system maintains a database and/or repository of user groups that use the information management system. Examples of user groups include, but are not limited to, "administrators," "developers," "operators," "users," "cloud developers," "system engineers," and so forth. The user groups may be defined by an organization that implements the information management system and may be associated with a particular role and/or function within the organization. The information management system may include a directory server, where the directory server maintains a listing of the user groups and allows an administrator and/or operator of the information management system to make modifications to the user groups. For example, the administrator and/or operator may have permission to add, remove, edit, update, and/or otherwise modify one or more of the user groups maintained by the directory server.

Each of the user groups may include one or more users. Furthermore, more a single user may belong to multiple groups. For example, a user may belong to both the "developers" user group and the "users" user group. An administrator or operator of the information management system may manage the user groups to which a user belongs via the directory server.

The information management system may include one or more file repositories to which the users have access, where each of the one or more file repositories includes one or more files. Examples of file repositories include a software library, a project code base, a directory of files, and other such file repositories. Using client computing devices, the users may access the files of the file repositories via one or more networks.

In addition, the file repositories may reside on one or more computer-readable storage media of a storage array or other computing storage device. The storage array (or other computing device) may be configured to generate "snapshots" of each of the file repositories. As discussed below, a snapshot may be an "instant" image of primary data at a given point in time, and may include state and/or status information relative to an application that creates and/or manages the primary data. A snapshot may generally capture the directory structure of a file repository at a particular moment in time and may also preserve file attributes and contents. A snapshot in some cases is created relatively quickly, e.g., substantially instantly, using a minimum amount of file space, and may function as a conventional file system backup. In addition, a snapshot of a file repository may be accessible as a volume by a client computing device, such that the client computing device may access the files of the snapshot rather than the files of the file repository. In this regard, "mounting" is a process by which an operating system (e.g., the operating system of the client computing device) makes files and directories on a storage device available for users to access via the computer's file system. Thus, a mounted snapshot may be accessed and treated as if the snapshot was stored locally on a computer-readable storage medium (e.g., a hard drive) of the client computing device.

Although a mounted snapshot may be accessible as a readable volume to the client computing device, a loss of a connection between the client computing device and the mounted snapshot may result in a loss of access to the files of the mounted snapshot (e.g., an interruption of a network connection). Accordingly, selected files of the mounted snapshot may be copied to the client computing device while the mounted snapshot is available to the client computing device. In one embodiment, selected files of the mounted snapshot are copied to a cache of the client computing device, where files written to the cache may be accessible to the client computing device in the event of a network or communication interruption.

However, one of the challenges in copying files from the mounted snapshot to the cache is knowing which of the files of the mounted snapshot to copy. Accordingly, in one embodiment, the information management system includes one or more behavior models that have been trained using machine-learning algorithms with user interactions of the files of the file repository as training data. In particular, the information management system may include a baseline behavior model for each of the user groups, and each baseline behavior model may be trained with user interactions from one or more users of each of the user groups. A baseline behavior model may establish a baseline, or a default set, of which files to select to copy to a cache of a client computing device associated with a user of the user group corresponding to the baseline behavior model. A storage manager, discussed further below, may then cause the baseline behavior model to be copied to the client computing device along with the set of identified files derived from the baseline behavior model.

Once copied to the client computing device, the baseline behavior model may be further trained and/or modified with the interactions of the user associated with the client computing device. In this regard, the client computing device may be configured with a monitoring application or module that monitors user interactions with the files stored in the cache and/or the files of the mounted snapshot. In the interest of transparency, the user may be notified that his or her interactions are being monitored, and the user may be given the opportunity to opt-out from the monitoring, in which case, such interactions may not be monitored.

As the user interacts with the cached files and/or files of the mounted snapshot, the baseline behavior model is further refined and tailored to the user based on his or her interactions. In this regard, the client computing device may update the baseline behavior model based on these interactions to modify the baseline behavior model to better fit the user's expected behavior and the files that the user is most likely to interact with. This updated behavior model may then be used to determine which files to keep in the cache in the event that the available space in the cache becomes scarce or approaches a cache threshold.

As the user interacts with the mounted snapshot, a cache management application or module may determine whether one or more files can be removed from the cache. Selectively removing files from the cache is beneficial because it ensures that the cache has available space for files that the user may need and/or require to continue working. For example, there may be instances where the user requires a file from the mounted snapshot that has not been cached, and the cache management module may cache the file when the user accesses the file from the mounted snapshot. If the cache is not selectively cleared, the cache management module may not be able to copy the file from the mounted snapshot to the cache.

In managing the cache, the cache management application may assign a priority value to one or more of the files in the cache. The priority value indicates whether the file should be kept in the cache when compared with another priority value of another file. In one embodiment, a file with the higher priority value is kept in the cache (e.g., a higher priority value indicates that the file is more likely to be used by the user). In another embodiment, a file with a lower priority value is kept in the cache (e.g., a lower priority value indicates that the file is more likely to be used by the user). The cache management application may adjust and/or modify priority values as the user interacts with the files, regardless of whether the interaction is with a cached file or with the mounted snapshot version of the file.

In addition, a set of files may be grouped together such that the group of files are assigned the same priority value. As examples, and without limitation, a set of files may be grouped together where one or more of the files are linked to one another or where the files reference each other in some way (e.g., as in a software development project). In selectively removing a file from the cache, the cache management application may first inspect the priority value of the file and then, if the file has the same priority value as another file, then determine whether the file is grouped with a set of files. Files that are grouped together may be kept in the cache until the grouping has the lowest priority value (or highest priority value, depending on the implementation) so that the cache management application does not inadvertently removes files that are referenced by a larger group.

By using intelligent cache management and a tailored behavior model, the cache of a client computing device can be optimized so that the files residing in the cache are those that are most likely used, and/or to be used, by the user of the client computing device. This intelligence improves upon the functioning of the client computing device as it ensures that the available space in the cache is not used on relatively unimportant files, and that the client computing device is not constantly storing files to the cache from a mounted snapshot. This intelligence can be important in instances where the connection between the client computing device and the information management system is tenuous, and ensures that the client computing device is not needlessly transferring files from the information management system using the limited time and/or bandwidth available in the connection.

BRIEF DESCRIPTION OF THE DRAWINGS

FIG. 1B is a detailed view of a primary storage device, a secondary storage device, and some examples of primary data and a secondary copy of the primary data.

DETAILED DESCRIPTION

Detailed descriptions and examples of systems and methods according to one or more illustrative embodiments may be found in the section titled "Intelligent Cache Management for Mounted Snapshots based on a Behavior Model," as well as in the section titled Example Embodiments, and also in FIGS. 3-8 herein. Furthermore, components and functionality for the disclosed recovery manager may be configured and/or incorporated into information management systems such as those described herein in FIGS. 1A-1H and 2A-2C.

Various embodiments described herein are intimately tied to, enabled by, and would not exist except for, computer technology. For example, the transference of backup jobs from the storage manager to the recovery manager described herein, in reference to various embodiments, cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
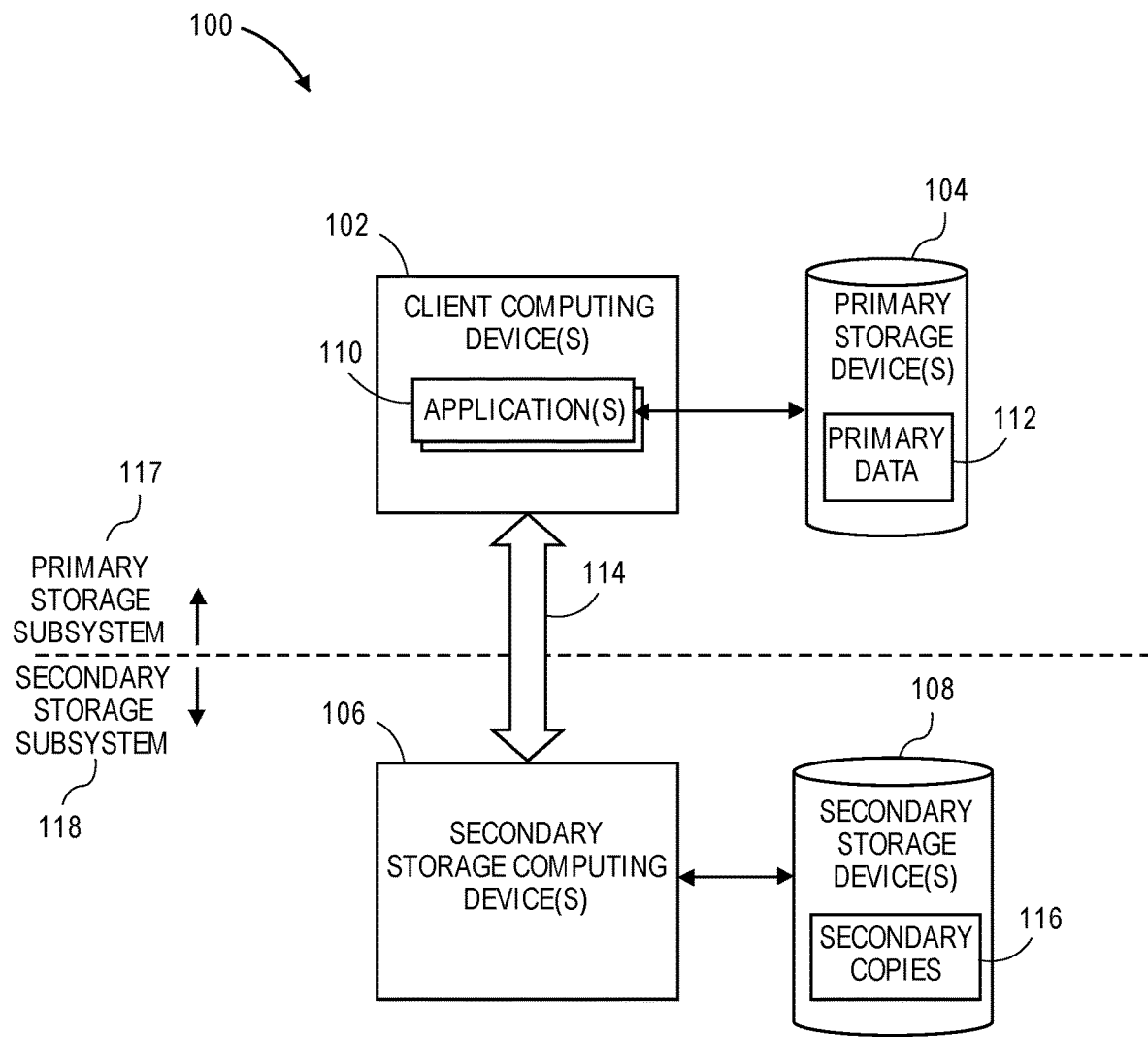
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,734,669, entitled "Managing Copies Of Data";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. Pub. No. 2006/0224846, entitled "System and Method to Support Single Instance Storage Operations" (now abandoned);

U.S. Pat. Pub. No. 2014/0201170, entitled "High Availability Distributed Deduplicated Storage System", now U.S. Pat. No. 9,633,033;

U.S. Pat. Pub. No. 2016/0041880 A1, entitled "Efficient Application Recovery in an Information Management System Based on a Pseudo-Storage-Device Driver", now U.S. Pat. No. 9,852,026;

U.S. patent application Ser. No. 14/721,971, entitled "Replication Using Deduplicated Secondary Copy Data" (applicant matter no. 100.422.US1.145; published as U.S. Pat. Pub. No. 2016/0350391;

U.S. patent application Ser. No. 14/805,615, entitled "Browse and Restore for Block-Level Backups" (applicant matter no. 100.434.US1.120; now U.S. Pat. No. 9,766,825.

U.S. Provisional Patent Application No. 62/265,339 entitled "Live Synchronization and Management of Virtual Machines across Computing and Virtualization Platforms and Using Live Synchronization to Support Disaster Recovery"; to which U.S. patent application Ser. No. 15/365,756 claims priority (now U.S. Pat. No. 10,228,962);

U.S. Provisional Patent Application No. 62/273,286 entitled "Redundant and Robust Distributed Deduplication Data Storage System"; to which U.S. patent application Ser. No. 15/299,254 (now U.S. Pat. No. 10,310,953), Ser. No. 15/299,281 (published as U.S. Pat Pub. 2017-0192868), Ser. No. 15/299,291 (now U.S. Pat. No. 10,138,729), Ser. No. 15/299,298 (now U.S. Pat. No. 10,592,357), Ser. No. 15/299,299 (published as U.S. Pat. Pub. US 2017-0193003), and Ser. No. 15/299,280 (now U.S. Pat. No. 10,061,663) all claim priority;

U.S. Provisional Patent Application No. 62/294,920, entitled "Data Protection Operations Based on Network Path Information"; to which U.S. patent application Ser. No. 15/283,033 claims priority (published as U.S. Pat. Pub. No. 2017/0235647 (now abandoned));

U.S. Provisional Patent Application No. 62/297,057, entitled "Data Restoration Operations Based on Network Path Information"; to which U.S. patent application Ser. No. 15/286,403 claims priority (published as U.S. Pat. Pub. No. 2017/0242871); and U.S. Provisional Patent Application No. 62/387,384, entitled "Application-Level Live Synchronization Across Computing Platforms Including Synchronizing Co-Resident Applications To Disparate Standby Destinations And Selectively Synchronizing Some Applications And Not Others"; to which U.S. patent application Ser. No. 15/369,676 claims priority (now U.S. Pat. No. 10,387,266).

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS)

for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
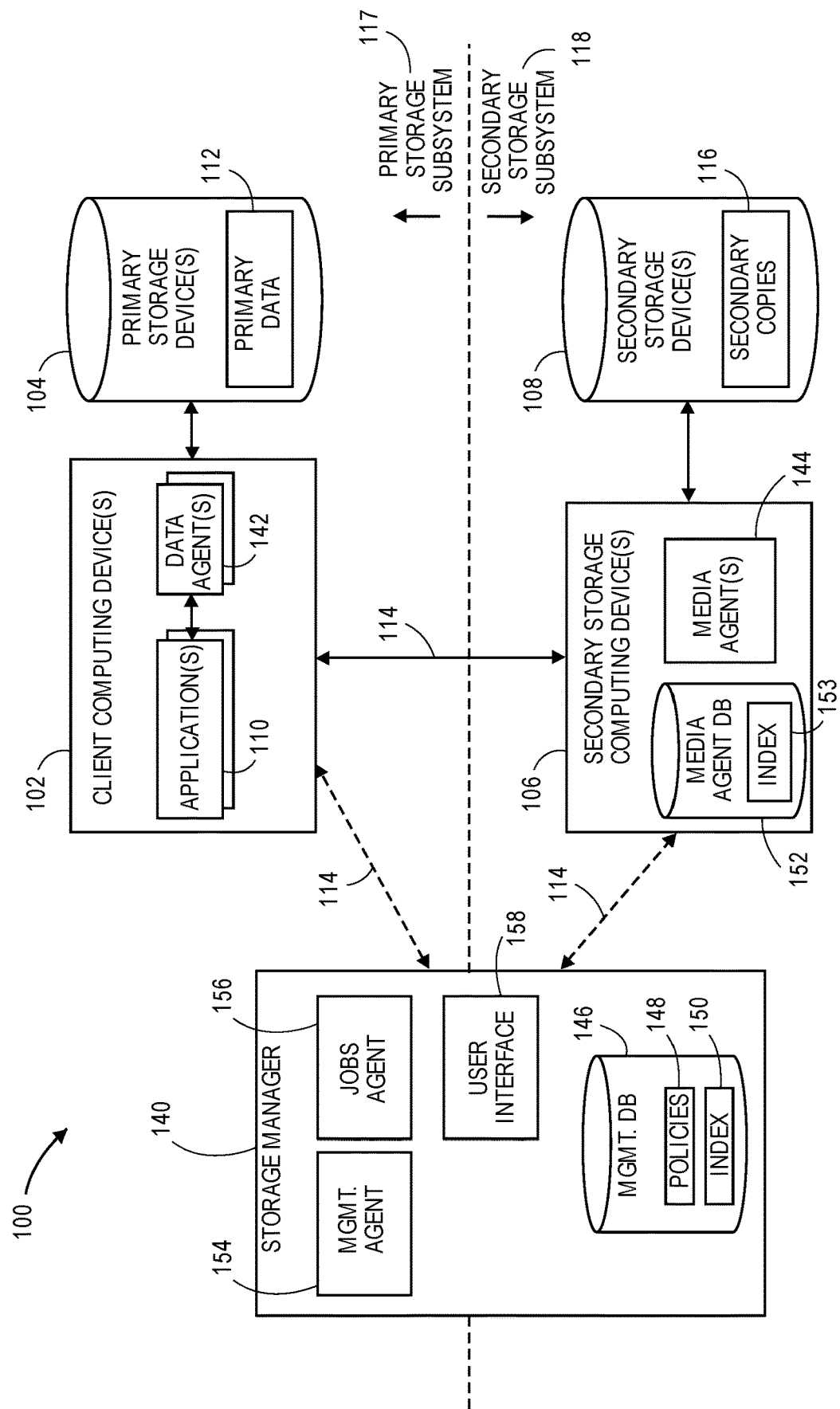
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134b represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:
- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, Share Point data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106.

Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
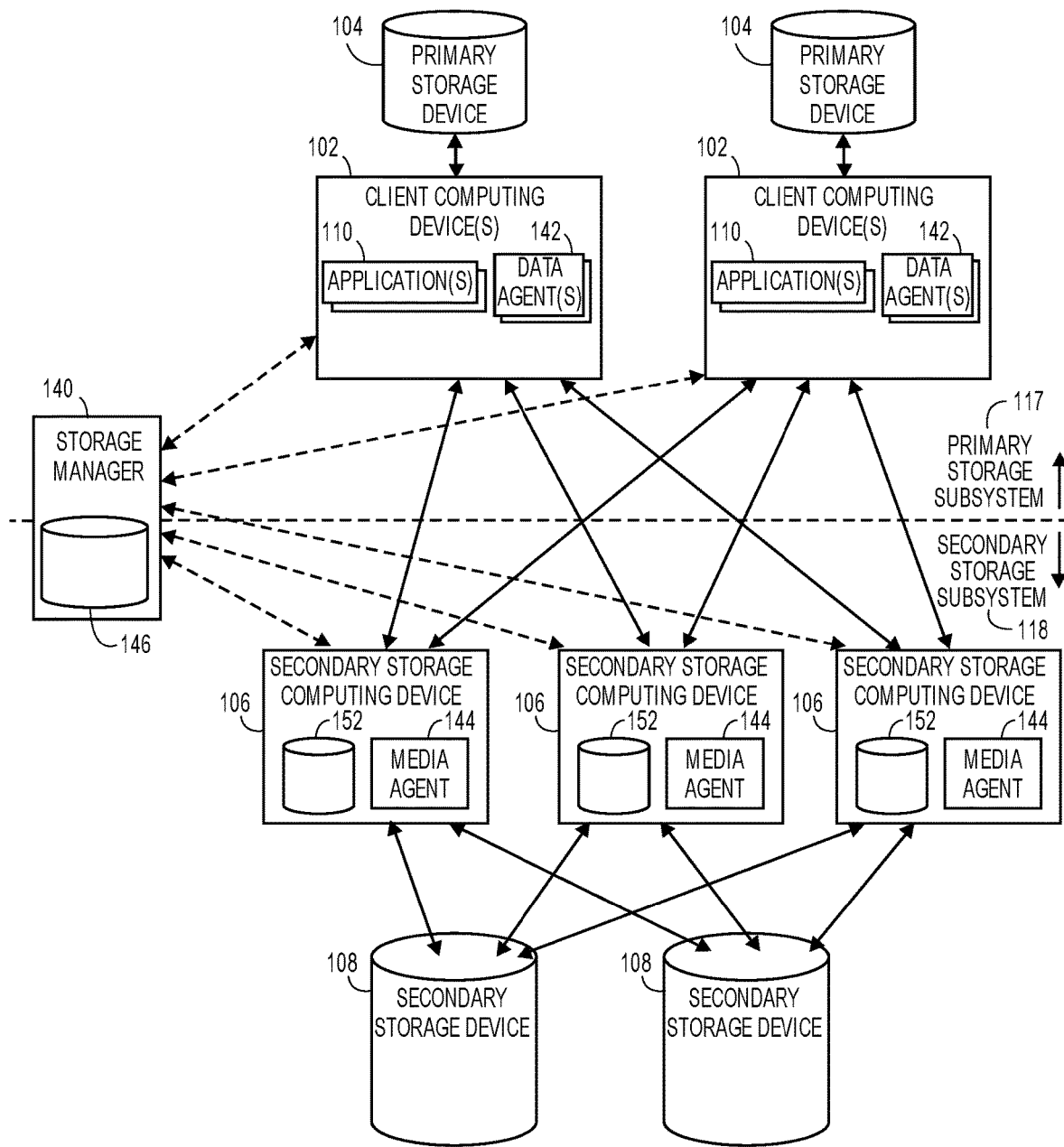
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and can make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
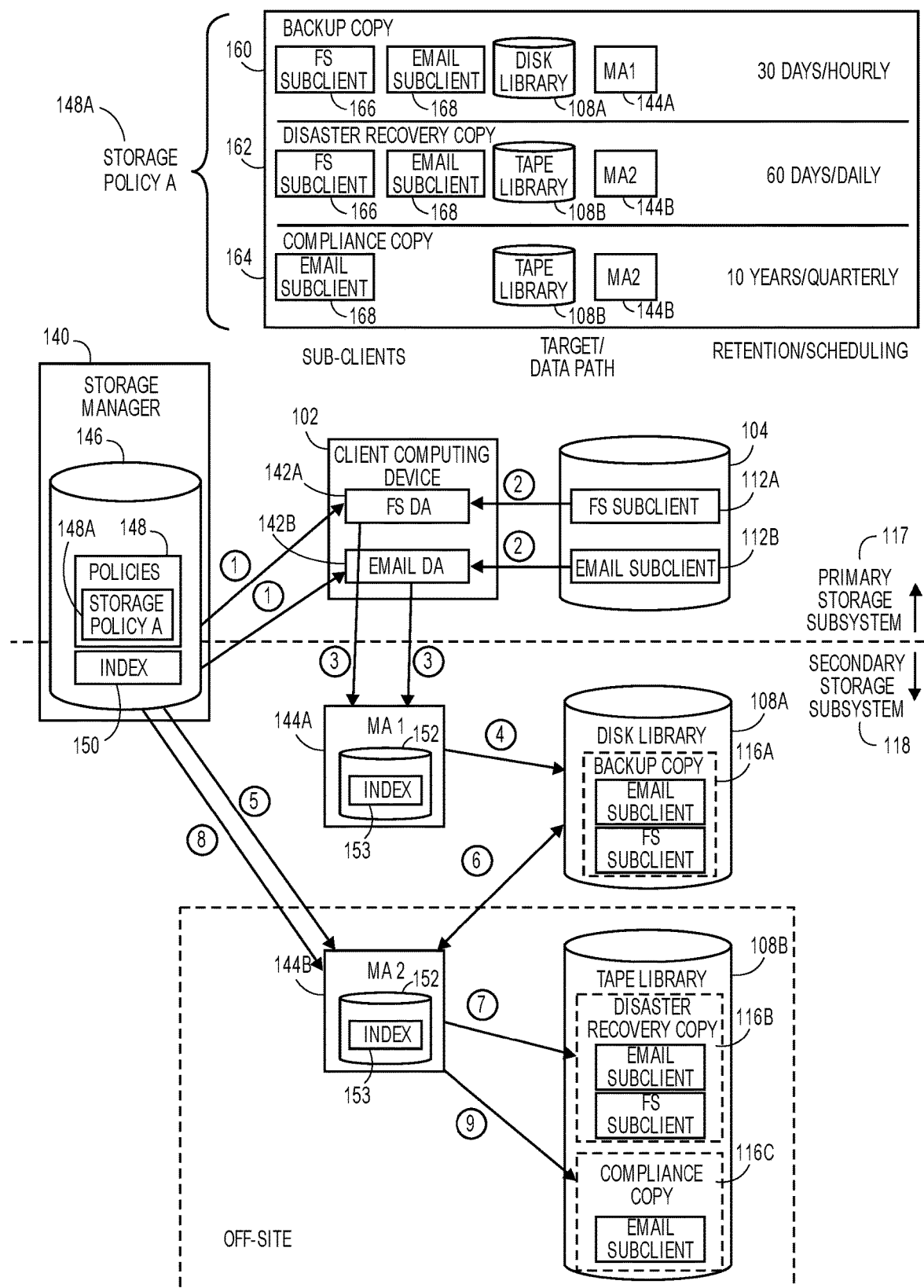
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
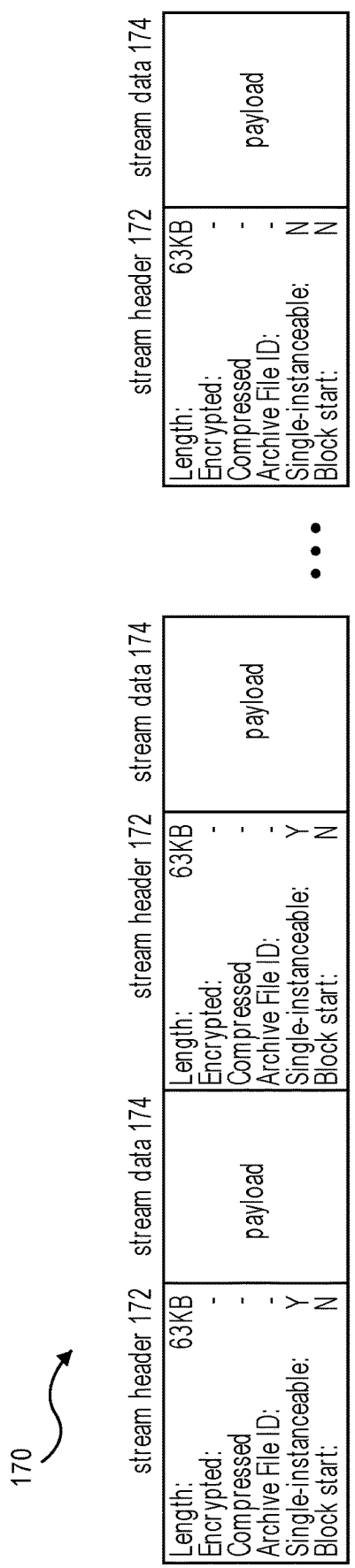
FIGS. 1F-1H are block diagrams illustrating suitable data structures that may be employed by the information management system.
Figure 1G:
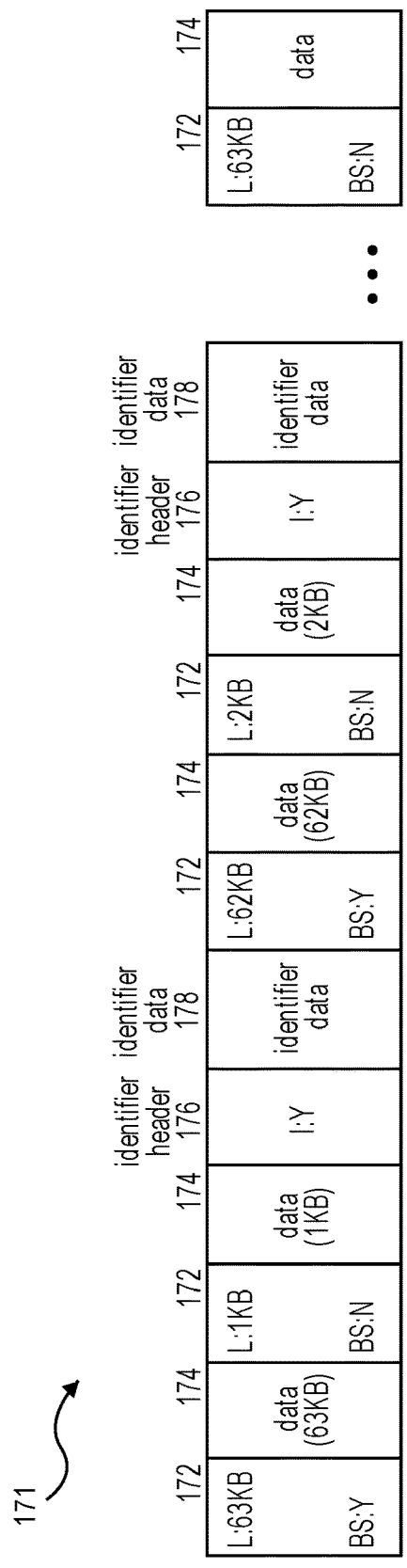

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
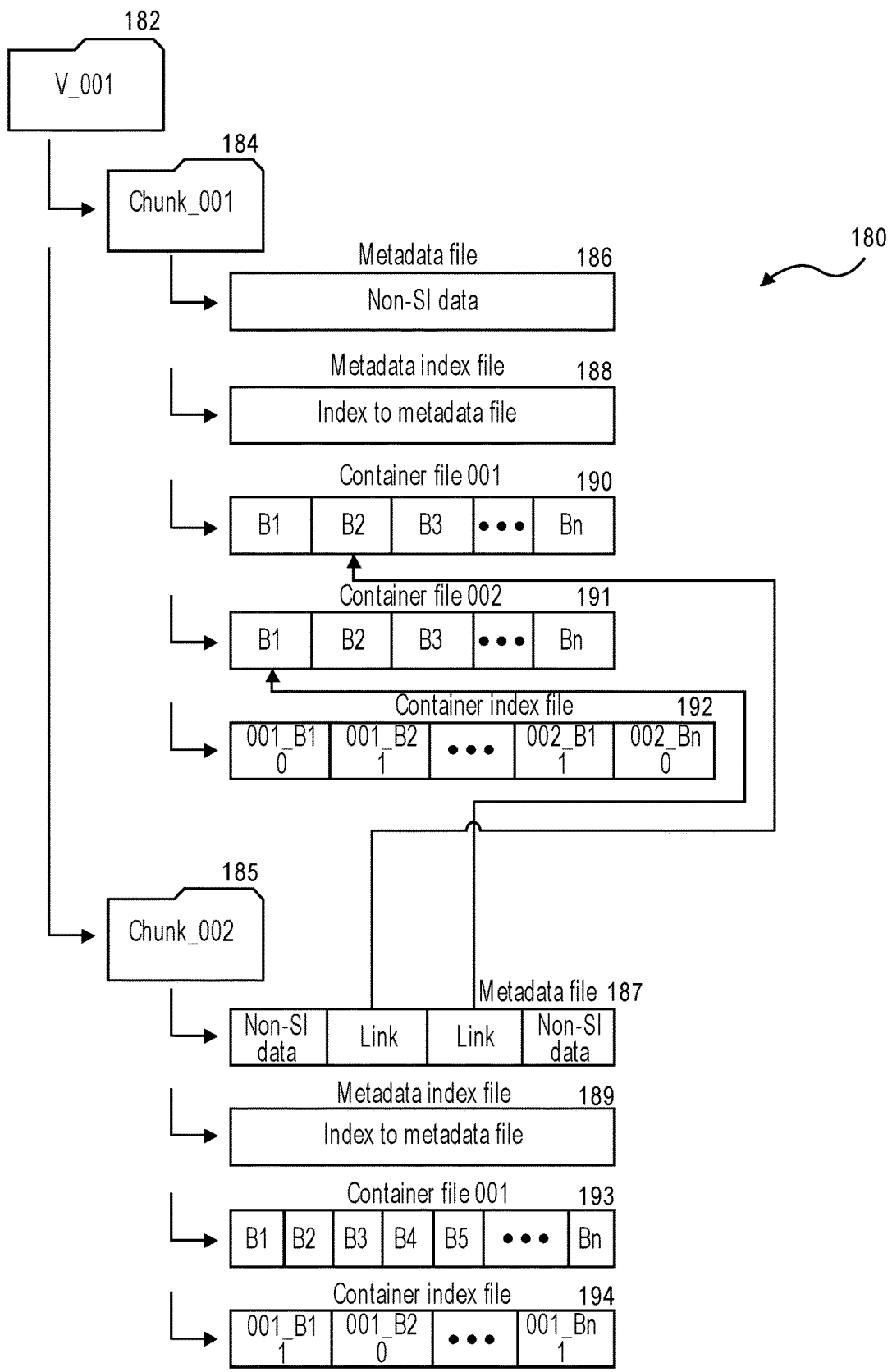

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
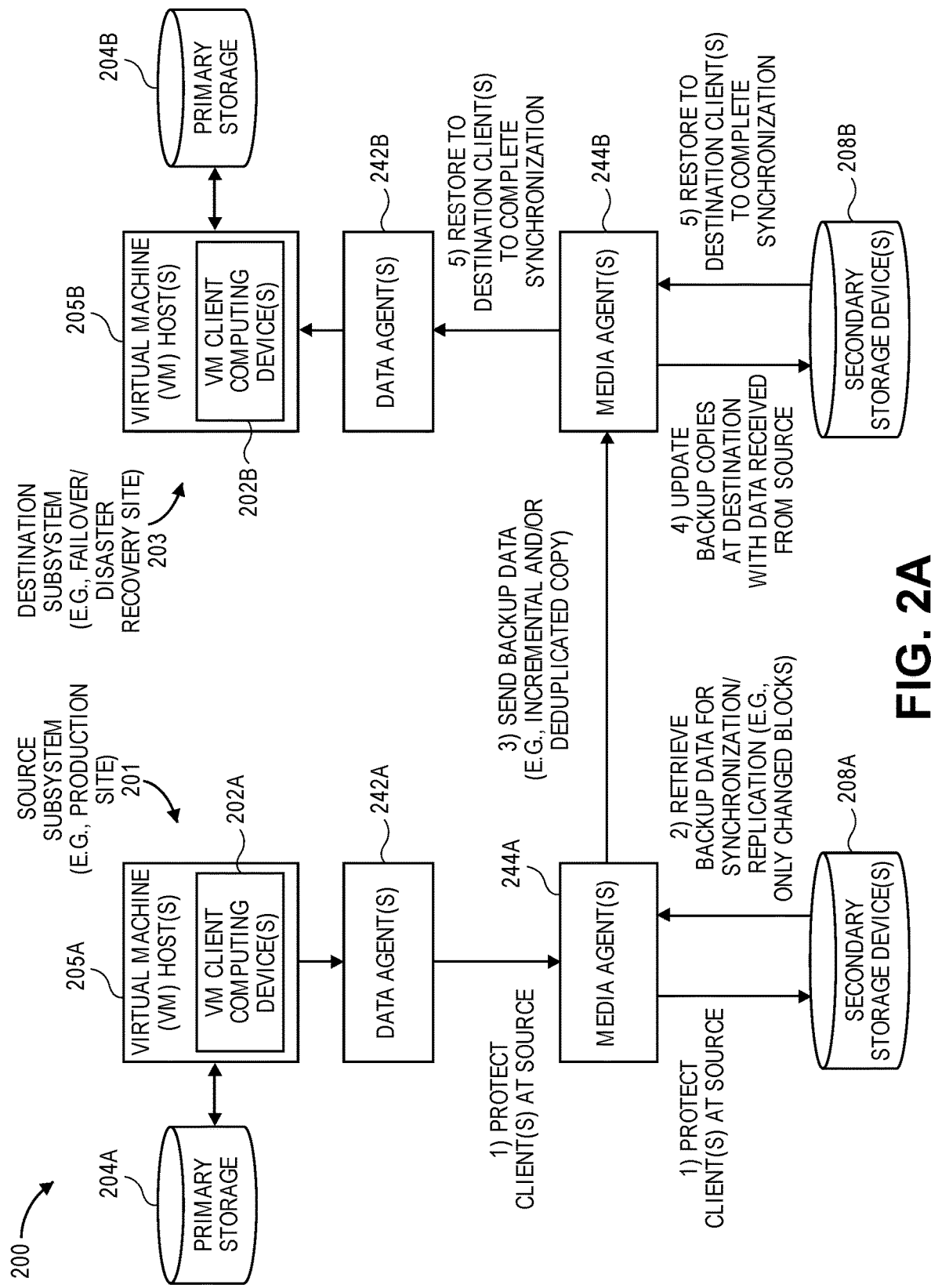
FIG. 2A illustrates a system and technique for synchronizing primary data to a destination such as a failover site using a secondary copy.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202*a* include one or more virtual machines (or "VMs") executing on one or more corresponding VM host computers 205*a*, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242*a* and source media agent(s) 244*a* work together to write backup or other secondary copies of the primary data generated by the source client computing devices 202*a* into the source secondary storage device(s) 208*a*. At step 2, the backup/secondary copies are retrieved by the source media agent(s) 244*a* from secondary storage. At step 3, source media agent(s) 244*a* communicate the backup/secondary copies across a network to the destination media agent(s) 244*b* in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244*b* write the received backup/secondary copy data to the destination secondary storage device(s) 208*b*. At step 5, the synchronization is completed when the destination media agent(s) and destination data agent(s) 242*b* restore the backup/secondary copy data to the destination client computing device(s) 202*b*. The destination client computing device(s) 202*b* may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating With the Cloud Using File System Protocols

Figure 2B:
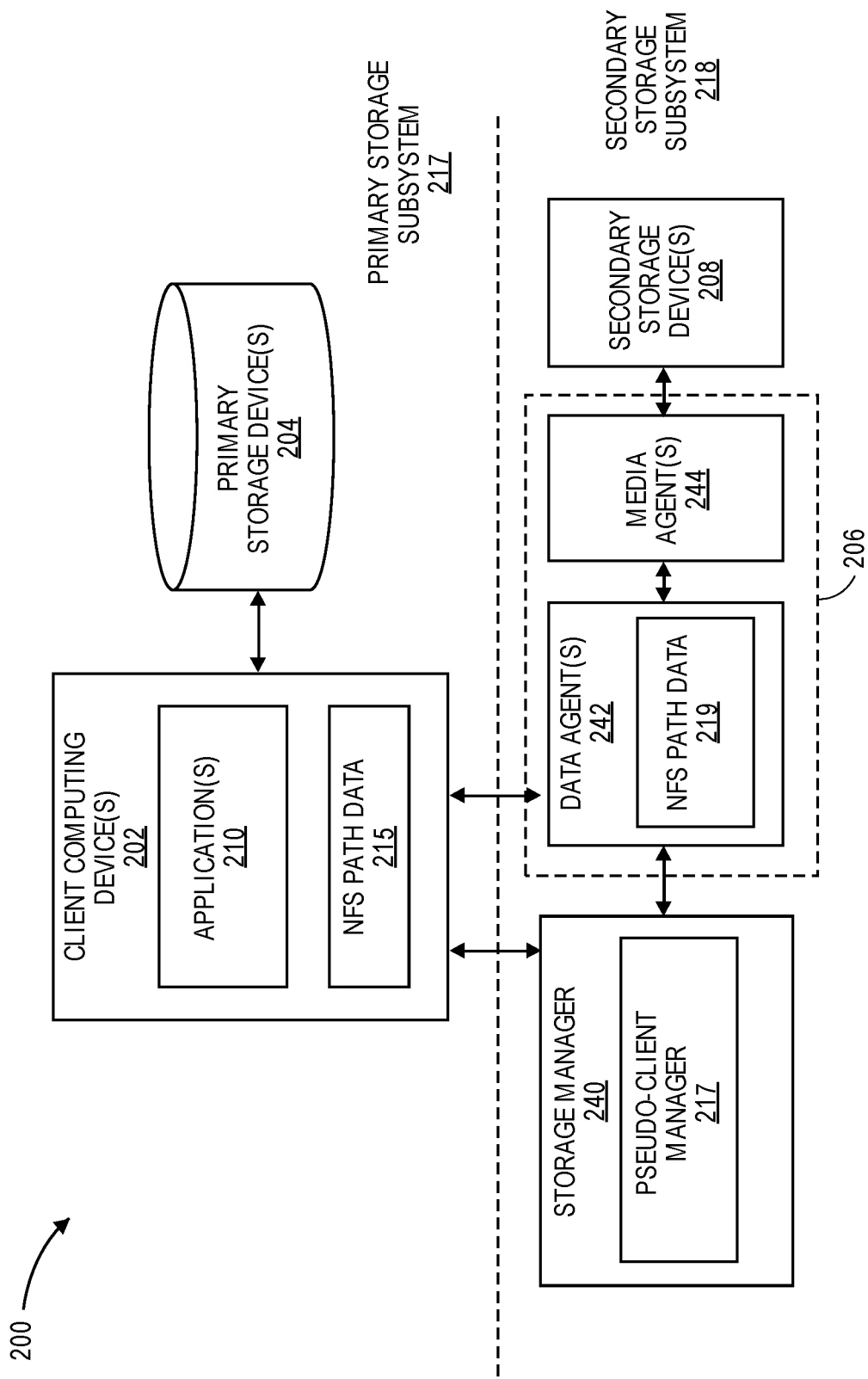
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
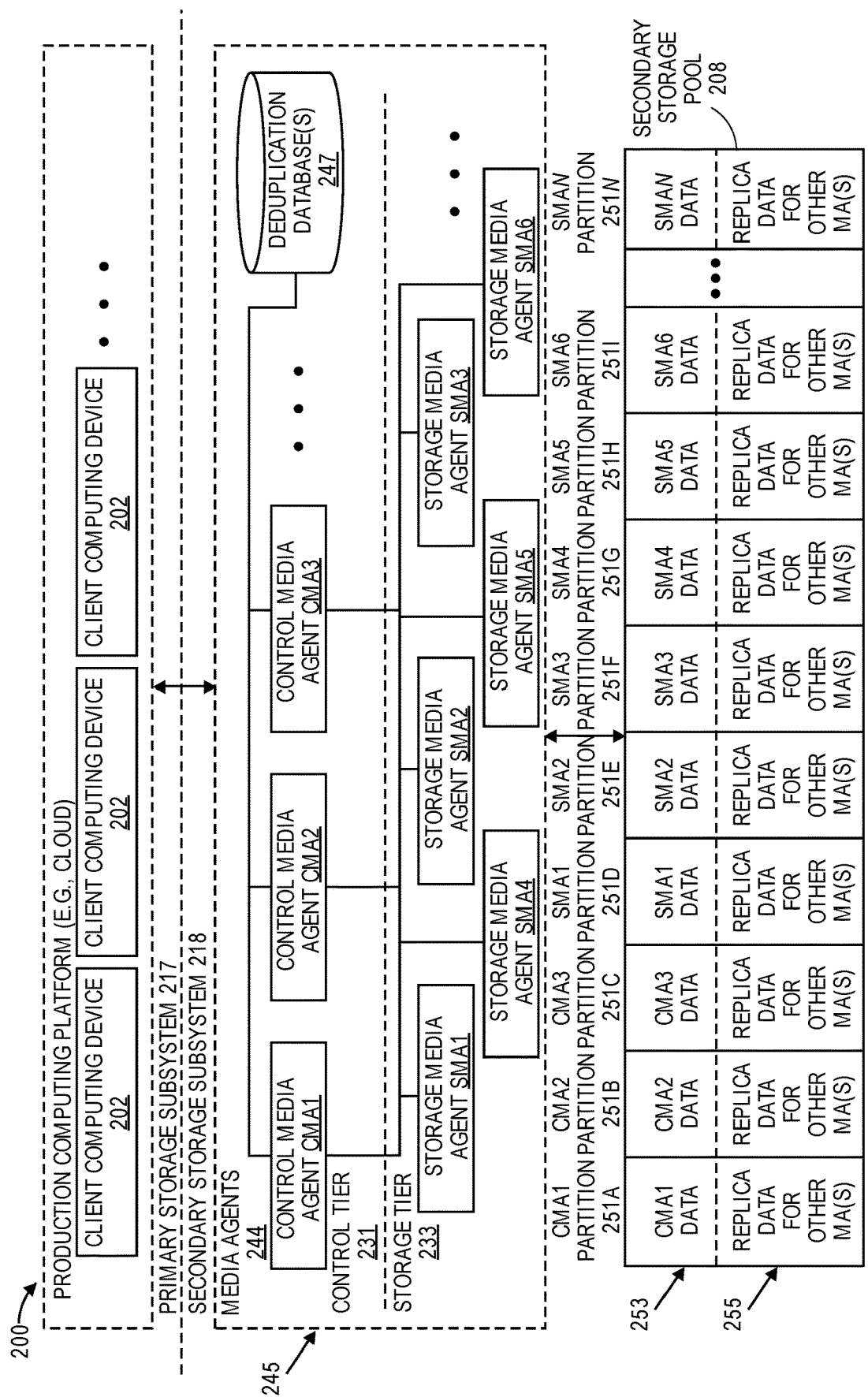
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Intelligent Cache Management for Mounted Snapshots Based on a Behavior Model

An information management system may include client computing devices, a storage manager, secondary storage computing devices, secondary storage devices, one or more storage arrays, a directory server, and other such devices and/or components. The directory server may facilitate the management of one or more user groups of the information management system, where each of the one or more user groups includes one or more users. The storage array may provide access to mountable snapshots to one or more of the client computing devices, where the client computing devices may access one or more files from the mountable snapshots. A storage manager may provide a baseline behavior model to the one or more client computing devices, and the client computing devices may include various applications and/or modules that are configured to further train and/or refine the baseline behavior model. The client computing devices, storage manager, secondary storage computing device, storage array, and directory server may each be in communication via one or more networks.

Figure 3:
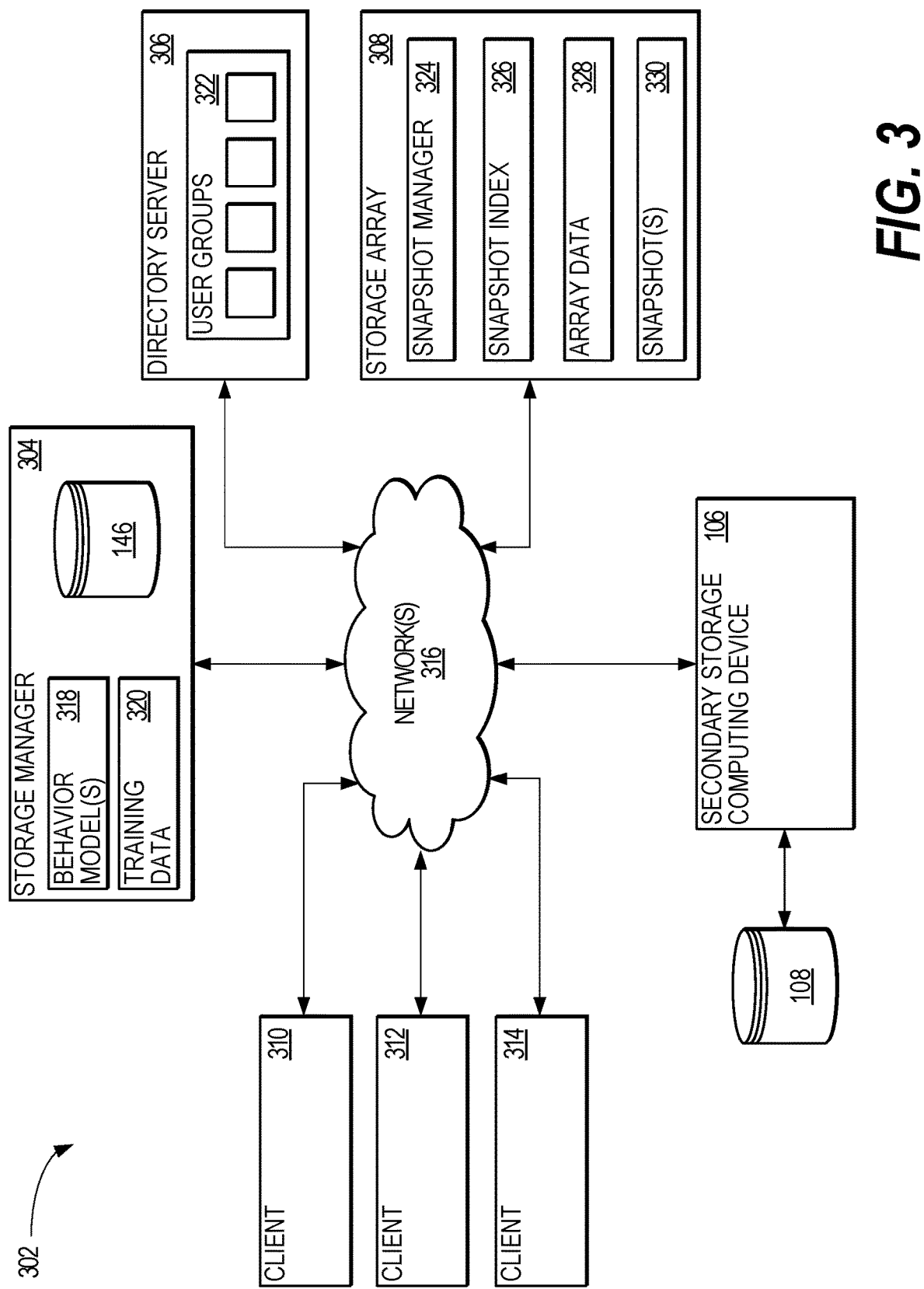
FIG. 3 illustrates a block diagram of an information management system that employs user behavior models for intelligently managing a cache of a client computing device, in accordance with an example embodiment.

FIG. 3 illustrates a block diagram of an information management system 302 that employs user behavior models for intelligently managing a cache of a client computing device, in accordance with an example embodiment. The information management system 302 may include one or more client computing devices 310-314 in communication with various devices of the information management system 302 via one or more network(s) 316. In one embodiment, this devices include a storage manager 304, a directory server 306, a storage array 308, and the secondary storage computing device 106.

The storage manager 304 may be implemented similarly to the storage manager 140 discussed with reference to FIG. 1C. In that regard, the storage manager 304 may include a management agent, a jobs agent, and a management database (not shown). In addition, the secondary storage computing device 106 shown in FIG. 3 may be implemented similarly to its implementation shown in FIG. 1C.

In addition to one or more of the components of the storage manager 140 shown in FIG. 1C, the storage manager 304 may also include one or more behavior model(s) 318 and training data 320. The one or more behavior model(s) 318 may be implemented as machine-learning models that can be trained to recognize patterns, behaviors, or likely outcomes given a set of training data, such as training data 320. Each of the behavior model(s) 318 may be configured to output or predict the files that a particular user group is likely to access given a particular set of files. A behavior model 318 may be used by a client computing device 310-314 to predict and/or determine which of the files from a mounted snapshot of the storage array 308 should be download and/or transferred to a cache of the client computing device 310-314. As discussed below, using a behavior model 318 to determine which of the files to download from a mounted snapshot is beneficial to a client computing device because it ensures that the available cache space of a client computing device is efficiently used, and that files from a mounted snapshot are not transferred to the client computing device that are not likely to be used by a user.

In one embodiment, the behavior models 318 are implemented by using a machine-learning algorithm and training data 320. Examples of machine-learning algorithms include, but are not limited to, k-Nearest Neighbor (kNN), linear regression, sum-of-squares decomposition (S3D), singular value decomposition (SVD), support vector machines (SVMs), naïve Bayes classifiers, other such machine-learning algorithms, or combinations thereof. The training data 320 for the behavior models 318 may be empirical data collected from monitoring user interactions with one or more files accessible via the storage array 308. In one embodiment, the training data 320 is grouped according to the user groups 322, and the training data 320 includes user interactions with one or more of the files accessible via the storage array 308. The storage array 308 may be configured with a monitoring application (not shown) that monitors user interactions with the files accessible from the storage array 308, including those files that may be included in the one or more snapshot(s) 330. The storage array 308 may collect these interactions and communicate them periodically to the storage manager, where the interactions form the basis for the training data 320. The training data 320 may be anonymized such that the training data 320 does not record the personally identifying information about the user, but the user group to which the user belongs, the type of interaction, and the file with which the user interacted with.

The storage manager 304 may be configured to collect this training data 320 over a predetermined time period (e.g., a month, six months, etc.). The predetermined time period may be configured by an operator or administrator of the information management system 302. After the predetermined time period has elapsed, the various behavior model(s) 318 may be constructed using one or more of the aforementioned machine-learning algorithms and the training data 320. In one embodiment, a behavior model is constructed for each of the user groups 322 managed by the directory server 306. As an example, if there are a "developer" user group, an "engineer" user group, a "virtualization" user group, then the behavior model(s) 318 may also include a "developer" behavior model, an "engineer" behavior model, and a "virtualization" behavior model.

In some instances, the storage manager 304 may include one or more behavior model(s) 318 that correspond to combinations of user groups 322. For example, there may be a behavior model 318 that corresponds to a user group combination of "developer" and "virtualization." As another example, there may be a behavior model 318 that corresponds to a user group combination of "administrator" and "engineer." In this manner, there may be behavior model(s) 318 for each of the user groups 322, as well as behavior model9s) 318 for each combination, or unique combination, of the user groups 322.

When a behavior model is constructed or trained for a particular user group (or combination of user groups), the behavior model may be considered a "baseline" behavior model, e.g., a behavior model that is common or applicable to each of the users of the corresponding user group or corresponding user groups. When a client computing device (e.g., client computing device 310) connects with the information management system 302, the storage manager 304 may transfer a behavior model to the client computing device based on the user currently using the client computing device (e.g., based on which user group or user groups the user using the client computing device is associated with). As discussed below with reference to FIG. 4, through interactions with the storage array 308 and one or more snapshot(s) 330, the transferred behavior model may be tailored or re-trained to more accurately predict which files the user of the client computing device is likely to use. This tailoring or re-training refines the behavior model and, in turn, allows the behavior model to more accurately predict which files the user is likely to use, and which files should be stored, or retained, in a cache of the client computing device.

In addition to the storage manager 304, the information management system 302 may also include a directory server 306, where the directory server 306 allows an administrator or operator of the information management system 302 to manager various user groups 322. One example of a directory server 306 is Microsoft® Active Directory®, which is available from the Microsoft Corp., located in Redmond, Wash.

In one embodiment, the directory server 306 groups one or more users of the information management system 302 into user groups 322. The user groups 322 may include such user groups as "administrators," "operators," "power users," "regular users," "developers," and other such user groups. The storage manager 304 may communicate with the directory server 306 to determine the number of user groups 322 that are defined and, in response, prepare a corresponding number of behavior model(s) 318 for training. In another embodiment, an administrator and/or operator of the information management system 302 instructs the storage manager 304 to prepare a number of behavior model(s) 318, and then assigns a user group selected from the user groups 322 to each of the prepared behavior model(s) 318.

Each of the user groups 322 may also identify, or be associated with, one or more users of the information management system 302. The directory server 306 may also provide an API or other interface that allows other entities (e.g., devices, users, applications, etc.) to communicate with the directory server 306 and obtain and/or modify information about one or more users of the information management system 302. By querying the directory server 306, a device, application, user, etc., may obtain a listing of the users of the information management system 302. Furthermore, the listing may identify the user groups 322 to which users belong, which may be used by the storage manager 304 to select an appropriate behavior model 318 for transferring to a particular client computing device.

The information management system 302 may also include a storage array 308 for storing primary data accessible by one or more of the client computing devices 310-314. In one embodiment, the storage array 308 includes array data 328, which may include the primary data accessible by the one or more client computing devices 310-314. The storage array 308 may create one or more snapshots of the array data 328, and store such snapshots as snapshot(s) 330. To organize the snapshot(s) 330, the storage array 308 may maintain a snapshot index 326, where the snapshot index 326 includes metadata and/or information about one or more of the snapshot(s) 330.

The snapshot index 326 may include various metadata about one or more of the snapshot(s) 330. For example, for each snapshot 330, the snapshot index 326 may include metadata that indicates when the snapshot was created, the array data 328 from which the snapshot was created, the users that accessed the snapshot, the last time the snapshot was modified, and other such metadata information or combinations thereof. The snapshot index 326 may allow the snapshot manager 324 to determine the contents of one or more of the snapshot(s) 330 and inform a user or device that accesses the storage array 308 as to the contents of a particular snapshot 330.

The storage array 308 may allow one or more of the client computing devices 310-314 to access and/or "mount" one or more of the snapshot(s) 330. As known to one of ordinary skill in the art, mounting is the process by which an operating system makes files and directories (such as one or more of the snapshot(s) 330) available for users to access via a computer's file system. The storage array 308 may communicate with one or more of the client computing devices 310 via one or more networking protocols, such as the Network File System (NFS) protocol and/or the Common Internet File System (CIFS) protocol to make the snapshot(s) 330 available. NFS and CIFS are protocols designed to allow a client system to view and access files stored on a remote computing device, such as the storage array 308.

The storage array 308 may include array data 328 that undergoes frequent changes and it may be challenging for any one client computing device to rely on the stability of the array data 328. For example, the array data 328 may be a software library or software development project that undergoes frequent change (e.g., from being modified by one or more software engineers), and it would be difficult for a software engineer to rely on array data 328 without knowing whether such array data 328 had changed. However, by creating one or more snapshot(s) 330 of the array data 328 at various points in time, the storage array 308 can provide a stable set of array data 328 to users of the client computing devices 310-314. There are various techniques known in the art for creating snapshot(s) 330, including hardware-based and software-based techniques, and this disclosure contemplates the use of such techniques in creating the snapshot(s) 330. The particularities in which the one or more snapshot(s) 330 are created is not germane to this disclosure, and the details of such techniques have been omitted for brevity and readability.

When a client computing device mounts one or more of the snapshot(s) 330, the files of the mounted snapshot may then be available to the client computing device (e.g., for reading, for writing, for modifying, etc.). Once the one or more snapshot(s) 330 are mounted, the client computing device may transfer one or more files from the snapshot(s) 330 to an local cache for faster and/or more reliable access. As briefly mentioned above, and discussed with reference to FIG. 4, the client computing device may include one or more of the behavior model(s) 318, which may be used to determine which of the files from the mounted snapshot are to be transferred to the client computing device. In transferring the files from the mounted snapshot to the local cache of the client computing device, there may be an initial transfer of files, in which a behavior model determines which of the files from the mounted snapshot to transfer. The client computing device may be configured to perform this initial transfer to ensure that a predetermined set of files are available in the cache to the client computing device in the event that the connection between the client computing device and the storage array 308 becomes disconnected.

Referring back to the components of the storage array 308, and in addition to maintaining metadata about one or more of the snapshot(s) 330, the snapshot index 326 may also include metadata about one or more files of the one or more snapshot(s) 330. The snapshot index 326 may include metadata about one or more files for the one or more snapshot(s) 330 to make it easier to understand the contents of a particular snapshot. In addition, the metadata about the files may assist the behavior model(s) 318 in understanding which files from the one or more snapshot(s) 330 to initially transfer to a client computing device.

Metadata about the files of the one or more snapshot(s) 330 may include various details about each file. For example, the metadata may include, but is not limited to, the date on which a file was created, the date on which a file was last modified, the owner of the file, whether the file is read-only, subject matter tags for the file, where the subject matter tags include one or more keywords or terms that describe the file, any projects to which the file belongs, and any dependencies that reference the file. Metadata for the one or more files may be obtained from various sources within the information management system 302 including, but not limited to, the file system on which the file resides, the operating system that manages the file system on which the file resides, or from manual input provided by one or more users of the information management system 302. As one example of manual input, the subject matter tags may be provided by software engineers or software developers as they interact with the files (e.g., via a graphical user interface used to navigate the file system of the storage array 308).

The metadata for the one or more files may be used by other components or entities in the information management system 302 in the determination of which files to cache in a client computing device, and which files should remain in the cache. In one embodiment, the metadata about the files of the one or more snapshot(s) 330 are used by one or more of the behavior model(s) 318 to determine which of the files should be transferred to a cache of a client computing device. In addition, the metadata may be used by a behavior model to determine which files should remain in the cache. Further still, the storage manager 304 may monitor interactions with the files of the storage array 308, including files from the one or more snapshot(s) 330 and/or array data 328, and may use the interactions and metadata to construct training data 320. The storage manager 304 may construct the training data 320 over a predetermined time period, at the end of which, the storage manager 304 may then train the behavior model(s) 318 using the training data 320.

One or more of the client computing devices 310-314 may access one or more snapshot(s) 330 of the storage array 308 via the snapshot manager 324. As mentioned above, a client computing device may mount one or more of the snapshot(s) 330, where the mount request is transmitted to and/or received by the snapshot manager 324. The snapshot manager 324 may expose one or more of the snapshot(s) 330 for mounting and may facilitate the mounting of one or more requested snapshot(s) 330.

Figure 4:
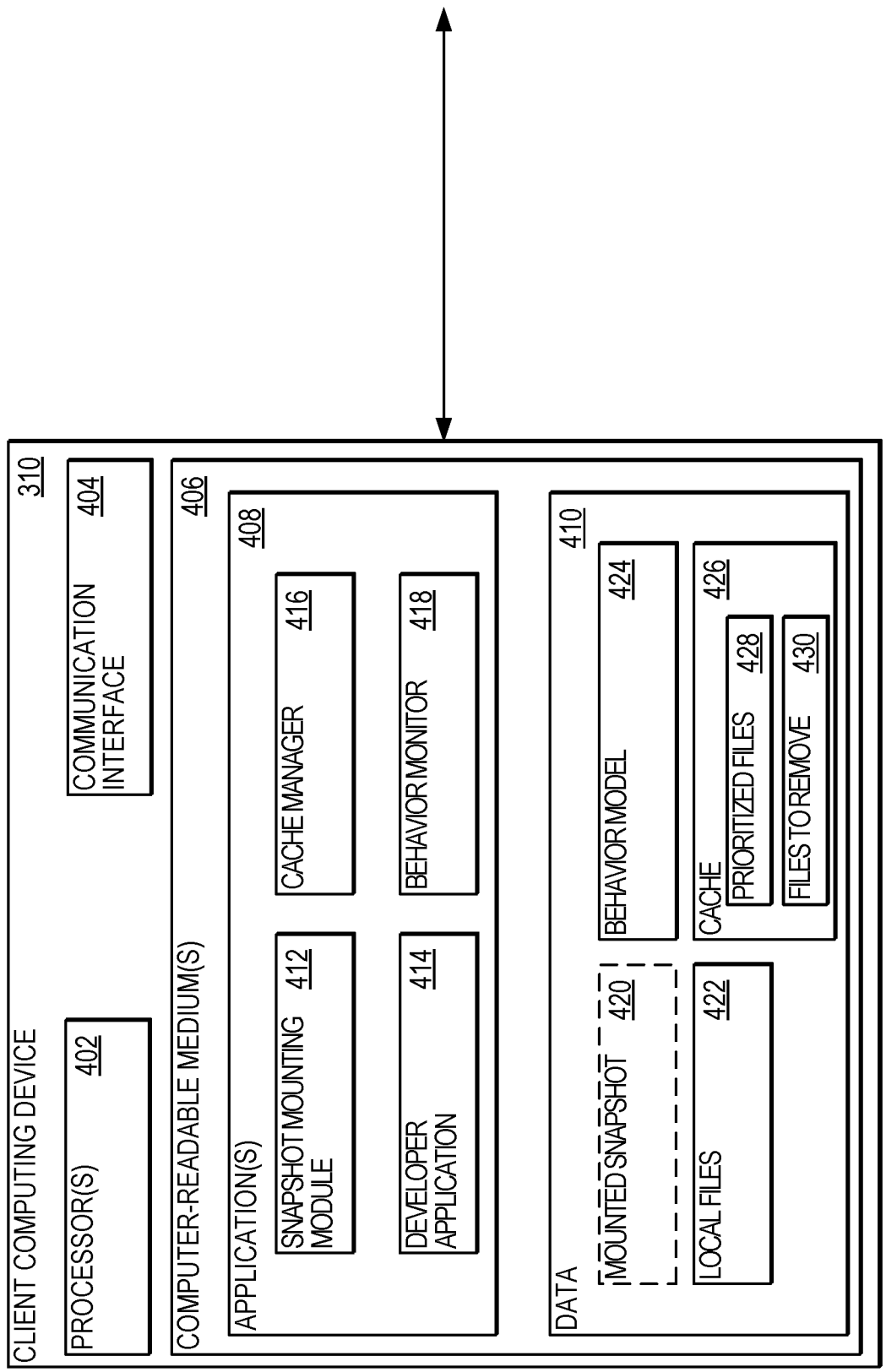
FIG. 4 illustrates a block diagram of a client computing device from the information management system of FIG. 3, in accordance with an example embodiment.

In interacting with the one or more snapshot(s) 330, a client computing device may transfer one or more files from the one or more snapshot(s) 330 to an local cache so that an application or other component can operate with and/or on the cached copy of the file rather than the version of the file included in the mounted snapshot. FIG. 4 illustrates a block diagram of a client computing device 310 from the information management system 302 of FIG. 3, in accordance with an example embodiment.

In one embodiment, the client computing device 310 includes one or more processor(s) 402, one or more communication interface(s) 404 for communicating with the devices and/or components of the information management system 302, and one or more computer-readable medium(s) 406. The one or more computer-readable medium(s) 406 may store one or more application(s) 408 and data 410 that supports the functionalities provided by the one or more application(s) 408. The client computing device 310 may also include components typically found in a computing device (e.g., a display, one or more input devices, a Global Positioning System transceiver, audio input/output devices, etc.), and a discussion of these components have been omitted for brevity and readability.

The application(s) 408 include various application(s) and/or module(s) that facilitate the intelligent management of an local cache 426. In one embodiment, the one or more application(s) 408 include a snapshot mounting module 412, a developer application 414, a cache manager 416, and a behavior monitor 418.

Referring back to FIG. 3 and with continuing reference to FIG. 4, the client computing device 310 may communicate with the various devices and/or components of the information management system 302 via the communication interface 404 and the one or more network(s) 316. When the client computing device 310 connects to the information management system 302, the client computing device 310 may announce itself to other devices and/or components in communication with the one or more network(s) 316 via a network broadcast communication packet. The storage manager 304 may be configured to listen for such network broadcast communication packets and take one or more actions in response.

In one embodiment, when the client computing device 310 connects with the information management system 302, the storage manager 304 may initially determine whether the client computing device 310 has a behavior model associated with the user currently using the client computing device 310. For example, the storage manager 304 may query the behavior monitor 418 to perform this determination. Where the behavior monitor 418 responds affirmatively (e.g., that there is a behavior model associated with the current user), the storage manager 304 may take no further action with regard to transferring a behavior model to the client computing device 310. Alternatively, where the behavior monitor 418 responds in the negative (e.g., that there is not a behavior model associated with the current user), the storage manager 304 may perform one or more operations to transfer a behavior model to the client computing device 310.

In transferring a behavior model to the client computing device 310, the storage manager 304 may first determine the user group(s) to which the current user of the client computing device 310 belongs. In one embodiment, the storage manager 304 may query the client computing device 310 for the username of the currently logged in user, receive the username from the client computing device 310, and then query the directory server 306 using the received username to obtain the user groups 322 to which the user belongs. Using the received user groups 322, the storage manager 304 then selects one or more behavior model(s) 318 that correspond to the received user groups 322. The storage manager 304 may then transfer the selected behavior model(s) 318 to the client computing device 310 via the behavior monitor 418, which may then store the one or more behavior model(s) as the behavior model 424. The transferred behavior model may be considered a baseline behavior model and, as the user interacts with the storage array 308, the behavior monitor 418 may refine and/or re-train the behavior model 424 with the user's interactions to obtain a behavior model that better predicts outcomes and files to retain in the cache 426 based on the user's interaction. In one embodiment, the behavior monitor 418 maintains a log and/or a record of the user's interactions with one or more files of a mounted snapshot and, at predetermined time intervals, retrains the behavior model 424 with the user's interactions with the files of the mounted snapshot.

Referring next to the snapshot mounting module 412, the snapshot mounting module 412 is configured to mount one or more snapshot(s) 330 that are available from the storage array 308. In one embodiment, a user of the client computing device 310 may use a command-line and/or graphical user interface to communicate with the storage array 308 and obtain a listing of the snapshot(s) 330 that may be mounted by the snapshot mounting module 412. The snapshot mounting module 412 may communicate with the snapshot manager 324 via one or more network(s) 316 using various communication protocols (e.g., NFS, CIFS, TCP/IP, etc.), and obtain a listing of the available snapshot(s) 330. In one embodiment, the snapshot manager 324 references the snapshot index 326 to obtain information about the snapshot(s) 330 that are available for mounting, and may provide this information to the snapshot mounting module 412. Using the command-line or graphical user interface, the user of the client computing device 310 may browse through the various snapshot(s) 330 and view information about each of the snapshot(s) 330. For example, the snapshot mounting module 412 may be integrated into a graphical user interface, such as Microsoft® Windows® Explorer, and the user may preview a selected snapshot or view information about a selected snapshot accessible via the snapshot manager 324. The information that may be provided to the user may include, but is not limited to, the files of the snapshot, the creation date of the snapshot, a version of the snapshot, the directories and/or file system structure that corresponds to the snapshot, the date on which the snapshot was last modified, and other such information or combination thereof.

When a selected snapshot is mounted by the snapshot mounting module 412, the selected snapshot may appear as mounted snapshot 420. As the connection between the client computing device 310 and the storage array 308 may be tenuous and/or unstable, the cache manager 416 may begin a process of transferring one or more files from the mounted snapshot 420 to an local cache 426. In one embodiment, the cache manager 416 initially establishes the local cache 426 based the size of the one or more computer-readable medium(s) 406 of the client computing device 310. The local cache 426 may be established within a computer-readable medium that is local to the client computing device 310 (e.g., does not require the use of the Internet to transfer files to and/or from the local cache). As another example, the local cache 426 may be created using a computer-readable medium that is housed within the client computing device 310 (e.g., a hard drive, a solid state drive, etc.) and connected to the client computing device 310 using one or more local data transfer interfaces, such as Serial ATA (SATA), PCI Express, and/or Universal Serial Bus (USB). Additionally, and/or alternatively, the local cache 426 may be created from a computer-readable medium external to the client computing device 310 but connected via one or more local data transfer interfaces. The local cache 426 may be created from one or more computer-readable medium(s) 406 that are local to the client computing device 310 so that, in the event of a communication failure with the Internet, the client computing device 310 may still access the files stored within the local cache 426.

The cache manager 416 may create the local cache 426 based on the size of the computer-readable medium in which the local cache 426 resides. In one embodiment, the size of the local cache 426 is configurable by the user of the client computing device 310, and a user may instruct the cache manager 416 as to the size of the local cache 426 that the cache manager 416 should maintain. The size of the local cache 426 may be specified as an absolute value (e.g., 6 Gigabytes), as a percentage of free space of the computer-readable medium (e.g., 10% of available space), or as any other value.

When the client computing device 310 initially mounts a selected snapshot (e.g., as mounted snapshot 420), the cache manager 416 may begin a process of transferring one or more files from the mounted snapshot 420 to the local cache 426. In one embodiment, the cache manager 416 invokes and/or instantiates the behavior model 424 to determine which of the files from the mounted snapshot 420 to transfer to the local cache 426. In this regard, the input values to the behavior model 424 may include, but are not limited to, the size of the local cache 426, the user groups to which the user belongs, a listing of the files from the mounted snapshot 420, and metadata about one or more files from the mounted snapshot 420. The metadata of the one or more files from the mounted snapshot 420 may include, but is not limited to, a size of a file, file dependencies for a particular file, subject matter tags for a particular file, whether the file belongs to a development project with other files, a frequency of access for a particular or any other metadata about the file. In one embodiment, the metadata for the files of the mounted snapshot 420 may be obtained from the snapshot index 326 via a request by the snapshot mounting module 412 to the snapshot manager 324.

Using the one or more input values described above, the behavior model 424 may generate an initial list of files that it has determined should be transferred from the mounted snapshot 420 to the local cache 426. The initial list of files may be passed to the cache manager 416 using one or more message-passing techniques and/or shared memory techniques, and the cache manager 416 may begin the task of transferring the files from the mounted snapshot 420 to the cache 426. Because an input value to the behavior model 424 may be a size of the local cache 426, the list of files output by the behavior model 424 may be a list of files whose total size does not exceed the size of the local cache 426. Additionally, and/or alternatively, another input value to the behavior model 424 may be a cache threshold value that indicates the amount of cache space that should remain as free space within the local cache 426. The cache threshold value ensures that the entire local cache 426 is not entirely occupied by the initial list of files, and that there may be available space for additional files. The cache threshold value may be input as an absolute value or a percentage value. The foregoing input values to the behavior model 424 ensures that all of the files selected by the behavior model 424 for transferring to the local cache 426 can be stored in the local cache 426.

The cache manager 416 may then transfer one or more of the files identified in the list of files by the behavior model 424 to the local cache 426. The files transferred to the local cache 426 may represent those files that the behavior model 424 has determined as likely to be needed by the user of the client computing device 310. Once transferred to the local cache 426, one or more of the application(s) 408 may reference a file in the local cache 426 rather than the version of the same file in the mounted snapshot 420. In one embodiment, the cache manager 416 may redirect file read and/or file write operations from the version of the file stored in the mounted snapshot 420 to the version of the file stored in the local cache 426. For example, if a user is using the developer application 414 (e.g., a software development application) to read from and/or write to a file stored in the mounted snapshot 420, the cache manager 416 may redirect the read and/or write operations from the file stored in the mounted snapshot 420 to the version of the file stored in the cache 426. The cache manager 416 may redirect read and/or write operations to the versions of the files stored in the local cache 426 so that, in the event that the connection between the client computing device 310 and the storage array 308 becomes interrupted or is disconnected, then any changes to the files will be saved to the local cache 426. Saving changes to files to the local cache 426 allows the user of the client computing device 310 to continue working on these changed files, even in the event of a disruption between the client computing device 310 and the mounted snapshot 420.

In addition to redirecting read and/or write operations to files stored in the local cache 426, the cache manager 416 is also configured to synchronize changes between the versions of files stored in the local cache 426 and the versions of files stored in the mounted snapshot 420. In one embodiment, when a modification to a file occurs (e.g., a write operation that changes the content of the file), the cache manager 416 may first ensure that the change to the file occurs in the version stored in the local cache 426. The cache manager 416 may then copy the file stored in the local cache 426 to the mounted snapshot 420. In another embodiment, the cache manager 416 may determine the blocks that have changed relative to the changed file, and then replace corresponding blocks of the file stored in the mounted snapshot 420. In this alternative embodiment, only the changed blocks are copied over to the mounted snapshot 420, which reduces the amount of time needed to synchronize changes between the files stored in the local cache 426 and their corresponding versions stored in the mounted snapshot 420 (e.g., because the entire file is not being copied).

In some instances, the cache manager 416 synchronizes the changes between file versions (e.g., the version stored in the local cache 426 and the version stored in the mounted snapshot 420) shortly and/or immediately after the changes to the file have been written to the local cache 426. In this embodiment, the cache manager 416 performs the synchronizations between the local cache 426 and the mounted snapshot 420 to ensure that changes to the local cache 426 are immediately reflected in the mounted snapshot 420. In an alternative implementation, the cache manager 416 periodically synchronizes changes between files stored in the local cache 426 and their corresponding versions stored in the mounted snapshot 420. In this alternative implementation, the cache manager 416 may synchronize files in the local cache 426 with their corresponding versions in the mounted snapshot 420 as a batch process, where the cache manager 416 synchronizes multiple files stored in the local cache 426.

In some scenarios, the client computing device 310 may lose connectivity with the storage array 308 prior to the cache manager 416 being able to synchronize changes to the files stored in the local cache 426 with the corresponding counterparts stored in the mounted snapshot 420. Accordingly, in one embodiment, the cache manager 416 may be configured to periodically poll and/or attempt to communicate with the storage array 308 to determine whether connectivity has been restored. In another embodiment, the cache manager 416 may maintain a status indicator (e.g., a Boolean value, a numerical value, an alphanumeric character, etc.) that indicates whether the client computing device 310 has connectivity with the storage array 308. In this embodiment, one or more components, applications, and/or an operating system of the client computing device 310 may have access to the status indicator to change it based on whether client computing device 310 has connectivity with the storage array 308. Thus, in in this embodiment, rather than the cache manager 416 attempting to communicate with the storage array 308 to determine whether the client computing device 310 has connectivity with it, the cache manager 416 may reference the status indicator to determine whether the client computing device 310 has connectivity with the storage array 308. Other implementations and/or embodiments to inform the cache manager 416 of the connectivity status with the storage array 308 are contemplated as falling within the scope of this disclosure.

When connectivity has been restored to the storage array 308, the cache manager 416 may begin the process of synchronizing one or more files stored in the local cache 426 with their corresponding counterpart stored in the mounted snapshot 420. In one embodiment, the cache manager 416 may determine which files have changed since the last synchronization with the mounted snapshot 420. For example, the cache manager 416 may maintain a log of synchronizations with the mounted snapshot 420, determine the date and/or time when the last synchronization with the mounted snapshot 420 occurred, and then generate a list of files that have changed and/or been modified since the last synchronization. For each file in the generated list, the cache manager 416 may determine whether the mounted snapshot 420 includes the changed version of a file stored in the local cache 426. If the mounted snapshot 420 does not include the changed version, the cache manager 416 may copy the changed file to the mounted snapshot 420 and/or the portions of the changed file to the mounted snapshot 420 (e.g., depending on the particular implementation of the cache manager 416). The cache manager 416 may process each file in the generated list until the cache manager 416 has synchronized each file in the local cache 426 with its corresponding version stored in the mounted snapshot 420.

In addition to synchronizing files that were initially transferred to the local cache 426 (e.g., based on the stored behavior model 424), the cache manager 416 may update the local cache 426 based on a user's interactions with one or more files of the mounted snapshot 420. In one embodiment, the cache manager 416 updates the local cache 426 based on a user interaction (e.g., a read and/or write operation). In this embodiment, whenever the user interacts with a file from the mounted snapshot 420, the cache manager 416 first determines whether the file is stored in the local cache 426. Where the file is stored in the local cache 426, the cache manager 416 may then intercept and/or redirect read and/or write operations to the version of the file stored in the local cache 426. These interceptions and redirections may be transparent to the user such that the user is unaware that he or she is acting on the version of the file stored in the local cache 426 rather than the version stored in the mounted snapshot 420. Where the file is not stored in the local cache 426, the cache manager 416 may first copy the file from the mounted snapshot 420 to the local cache 426, and then intercept and/or redirect read and/or write operations to the version of the file copied to the local cache 426. In this embodiment, files that have not yet been copied to the local cache 426 may be copied to the local cache 426 as the user interacts with the file from the mounted snapshot 420.

In another embodiment, the cache manager 416 updates the local cache 426 based on further refinements and/or retraining of the behavior model 424. In this embodiment, the behavior monitor 418 may retrain and/or refine the behavior model 424 based on the user's interactions with one or more files stored in the local cache 426 and/or one or more files stored in the mounted snapshot 420. For example, the behavior monitor 418 may monitor whether the user opens a file to read and/or write via one or more of the applications 408 (e.g., the developer application 414). These interactions may be logged and/or collected over a predetermined time period (e.g., a day, a week, a month, etc.), and may form the basis as additional training data by which to further train the behavior model 424. Furthermore, the predetermined time period may be configured by an administrator and/or operator of the information management system 302. The value of the predetermined time period may be communicated by the storage manager 304 to one or more of the client computing devices 310-314 that are in communication with the information management system 302. In this way, the behavior monitor 418 may store and log the user's interactions with the files stored in the local cache 426 and/or the mounted snapshot 420.

To ensure user privacy, the behavior monitor 418 may notify the user that his or her interactions or being monitored, and may present a choice to the user as to whether the user agrees to the monitoring of his or her interactions with the files stored in the mounted snapshot 420 and/or the local cache 426. In this regard, the behavior monitor 418 may be limited to monitoring user interactions with the mounted snapshot 420 and/or the files stored in the local cache 426, and the user of the client computing device 310 may be informed accordingly (e.g., via a displayed prompt or the like). Should the user opt out of the monitoring, the behavior monitor 418 may inform the cache manager 416 that the local cache 426 should be disabled and that the user is limited to only being able to access files from the mounted snapshot 420 when there is a connection between the client computing device 310 and the storage array 308.

At the end of the predetermined time period, the behavior model 424 may be retrained and/or updated based on the logged user interactions with the files stored in the local cache 426 and/or the mounted snapshot 420. In one embodiment, the retraining is performed by the behavior monitor 418, which may retrain the behavior monitor 418 when the user is not using the client computing device 310. In another embodiment, the behavior monitor 418 communicates the logged interactions to the storage manager 304, which the retrains a behavior model selected from the behavior model(s) 318 using the logged interactions, and then communicates the retrained behavior model to the client computing device 310, which replaces the behavior model 424 that is currently stored as part of the data 410. The updated training data may include different types of data such as a listing of the files that the user interacted with, the type of interaction that the user performed, the number of times the user interacted with a particular file, the frequency of interaction with that particular file, the size of the local cache 426, and the available storage space in the local cache 426.

The updated behavior model 424 may be used by the cache manager 416 to determine which files should be retained in the local cache 426, which files to remove from the local cache 426, and which files should be copied from the mounted snapshot 420 to the local cache 426. During use of the local cache 426, it is possible that the local cache 426 no longer has sufficient storage for one or more files accessible from the mounted snapshot 420. For example, as files are copied from the mounted snapshot 420 to the local cache 426, the space available in the local cache 426 is reduced by a corresponding amount for each file copied. As the local cache 426 may have limited space, there may come a point in time where the cache manager 416 is no longer able to copy files from the mounted snapshot 420 to the local cache 426. When this occurs, the cache manager 416 may engage in a removal process, in which one or more files are deleted from the local cache 426.

To determine which files to remove from the local cache 426, the cache manager 416 may employ a variety of memory-management and/or space management techniques. As one example, the cache manager 416 may employ a Least Recently Used (LRU) technique, where one or more files that are least recently accessed (e.g., read from and/or written to) relative to the other files in the local cache 426 are removed. In this example, the cache manager 416 may compile a list of files that are the least recently used, and continue compiling this list until the amount of space of the files to be removed has reached a predetermined threshold. In one embodiment, the cache manager 416 may obtain the last time and/or date when a file was read from and/or written to by querying the operating system of the client computing device 310 and obtaining this information. In another embodiment, the cache manager 416 may query the behavior monitor 418 for its log of user interactions with the files stored in the local cache 426, and may analyze this log to determine which files were the least recently used (e.g., read from and/or written to). In either embodiment, the cache manager 416 generates a list of files to be removed based on this LRU memory management technique. The files to be removed from the local cache 426 may be represented as the files to remove 430 (or, simply, "files 430").

The local cache 426 may also use alternative memory management techniques for generating the list of files 430. As one alternative, the cache manager 416 may use the behavior model 424 to generate a list of files that should be kept in the local cache 426 (e.g., rather than generating a list of files to remove). As input values to the behavior model 424, the cache manager 416 may input the files currently stored in the local cache 426, the total amount of space for the local cache 426, a free space threshold value (e.g., a percentage or total value of the local cache 426 that should be made available or free), and the user interactions monitored by the behavior monitor 418. The foregoing input values are an example of one combination of input values that may be input to the behavior model 424, and other combinations and/or different value are also contemplated as falling within the scope of this disclosure. From the foregoing input values, the behavior model 424 may then generate the list of values that should be kept in the local cache 426. Using this list, the cache manager 416 may then select other files not in the list as the files 430 to be removed from the local cache 426.

The cache manager 416 may then determine whether any files in the files 430 have unsynchronized changes with their corresponding versions stored in the mounted snapshot 420. Where there are unsynchronized changes, the cache manager 416 may first attempt to synchronize the files 430 to be removed with their corresponding versions in the mounted snapshot 420. If the cache manager 416 is successful in synchronizing such changes, the cache manager 416 may then delete the file 430 from the local cache 426.

However, the cache manager 416 may not be successful in its attempt to synchronize the changes between the files 430 to be removed and their corresponding versions stored in the mounted snapshot 420. In one embodiment, where the cache manager 416 cannot, or is unable, to synchronize the changes between the files 430 to be removed and their corresponding versions stored in the mounted snapshot 420, the cache manager 416 may not delete these files. In addition, the cache manager 416 may prevent further writes to the local cache 426 so as to prevent additional bytes from being used in the local cache 426. Preventing writes to the local cache 426 may prevent additional data from being stored in the local cache 426 when the local cache 426 does not have such space available. In prevent further writes to the local cache 426, the cache manager 416 may generate a display or prompt that is displayed to the user of the client computing device 310 informing the user that the user cannot write data to the local cache 426 and/or to one or more files stored in the local cache 426. Additionally, and/or alternatively, the cache manager 416 may restrict the local cache 426 to a read-only mode, in which the user and/or processes of the client computing device 310 are able to read from, and not write to, the files stored in the local cache 426. In this implementation, the user and/or processes of the client computing device 310 may have access to the files stored in the local cache 426, but may only read data from such files and not commit further writes to them.

In some instances, there may be files stored in the local cache 426 that should not be deleted even where the cache manager 416 has used a memory management technique (e.g., the LRU memory management technique and/or the use of the behavior model 424) to identify such files for deletion. For example, one or more files identified for deletion may be part of a larger project and, even though such files may be used infrequently, these files may be integral to the larger project and the larger project may be unable to function without such files. Accordingly, in one embodiment, one or more files of the local cache 426 are assigned a priority value. Files identified with a priority value may be stored as prioritized files 428. In one embodiment, the cache manager 416 assigns a priority value to a file as it is being copied from the mounted snapshot 420, where the assigned priority value is based on the metadata associated with the file being copied. The cache manager 416 may obtain metadata about the file being copied in any number of ways. For example, the cache manager 416 may query, and/or invoke a function of, the snapshot mounting module to obtain the file metadata from the snapshot index 326 via the snapshot manager 324.

The cache manager 416 may also be configured with logic and/or rules that instruct the cache manager 416 how to assign priority values based on the obtained metadata. For example, the logic and/or rules may specify that a particular priority value is to be assigned to a file when the file is associated one or more metadata values. Additionally, and/or alternatively, the logic and/or rules may specify that one or more files are to be assigned a same priority value where the one or more files are associated with the same metadata value (e.g., a metadata value indicating that the files are part of a project). In one embodiment, the cache manager 416 is configured to assign different priority values to different files depending on the metadata associated with the file. In this embodiment, one or more files stored in the local cache 426 may have different priority values, where the different priority values indicate various levels of importance (e.g., a higher value may indicate greater importance or lower importance, depending on the particular implementation). In another embodiment, the cache manager 416 is configured to assign the same priority value to each file, indicating whether the file is a priority. In this alternative embodiment, the priority value simply distinguishes the file from other files that do not have an assigned priority value. Where the cache manager 416 is implemented to assign priority values to one or more files stored in the local cache 426, the cache manager 416 may maintain a data structure (e.g., a table, an array, a flat file, etc.), that associates priority values with their corresponding files. The cache manager 416 may then reference this data structure in determining whether a file stored in the local cache 426 has been assigned a priority value (e.g., is part of the group of files designated prioritized files 428).

In one embodiment, the priority values assigned to the one or more files of the local cache 426 affects which files are determined to be removed from the local cache 426. As one example, the cache manager 416 may process files based on whether the file has been assigned a priority value and then, if the cache manager 416 determines that additional files should be removed from the local cache 426, which files to remove based on their priority value. In this example, the cache manager 416 may first exclude from its removal determinations those files that have been assigned a priority value. The cache manager 416 may then generate a list of the files 430 to remove that includes only those files that do not have an assigned priority value. If the amount of space being reclaimed from these files is not sufficient, the cache manager 416 may then perform a second pass on determining which files to remove from the local cache 426 using the files that have been assigned a priority value as its focus (e.g., the prioritized files 428).

In performing this second pass, the cache manager 416 may process the files in order according to priority values (e.g., lowest priority files first) and, at each priority value, determine whether the cache manager 416 has identified a number of files whose collective file size, when added with the file size of the non-prioritized files, meets and/or exceeds the amount of space that the cache manager 416 is attempting to reclaim. If the cache manager 416 has not identified a sufficient number of files at one priority level, the cache manager 416 may then proceed to the next level of priority and attempt to identify those files that could be removed from the local cache 426. In identifying files to remove from the local cache 426 that have been assigned a priority value (e.g., those files that are part of the prioritized files 428), the cache manager 416 may employ one or more memory management techniques as described above including, but not limited to, the LRU memory management technique and/or the use of the behavior model 424, along with prior user interactions, in selecting which files to remove.

After the cache manager 416 has identified the files to remove from the local cache 426 and has performed any further synchronizations needed (or further selection of files if a synchronization cannot be performed), the cache manager 416 may then delete those files it has identified (e.g., files 430) from the local cache 426. Additional files may then be added to the local cache 426 based on monitored user interactions (e.g., via the behavior monitor 418) and through process This selective removal process has a number of benefits distinct from prior cache management techniques. One benefit is that the initial transfer of files from the mounted snapshot 420 to the local cache 426 is based on prior user interactions for users within the same cohort or user group. This benefit ensures that the initial transfer of files to the local cache 426 are relevant to the user of the client computing device 310, which further guarantees a high probability that the available space in the local cache 426 is used for files that the user may need. Another benefit is that the management of the cache is tailored to the specific behavior of the user and his or her interactions with the files stored in the mounted snapshot 420 and/or the local cache 426. This benefit confers a high likelihood that the cache manager 416 will cull those files from the local cache 426 that are least relevant to the user or files that are unlikely to be used by the user. Furthermore, with the use of assigned priority values, even files that the user is unlikely to directly use, but may use indirectly through one or more files in the same project, are protected from deletion by the cache manager 416. Other benefits that the disclosed embodiments and implementations provide include reduced downtime in the accessibility of files stored over a network (e.g., in the event that the connection between the client computing device 310 and the information management system 302 is disrupted), efficient network management and performance (e.g., because modifications to files occur in the local cache 426 before being propagated to the mounted snapshot 420), and tailored performance to the actual user of the client computing device 310, rather than a hypothetical or theoretical one.

Figure 5:
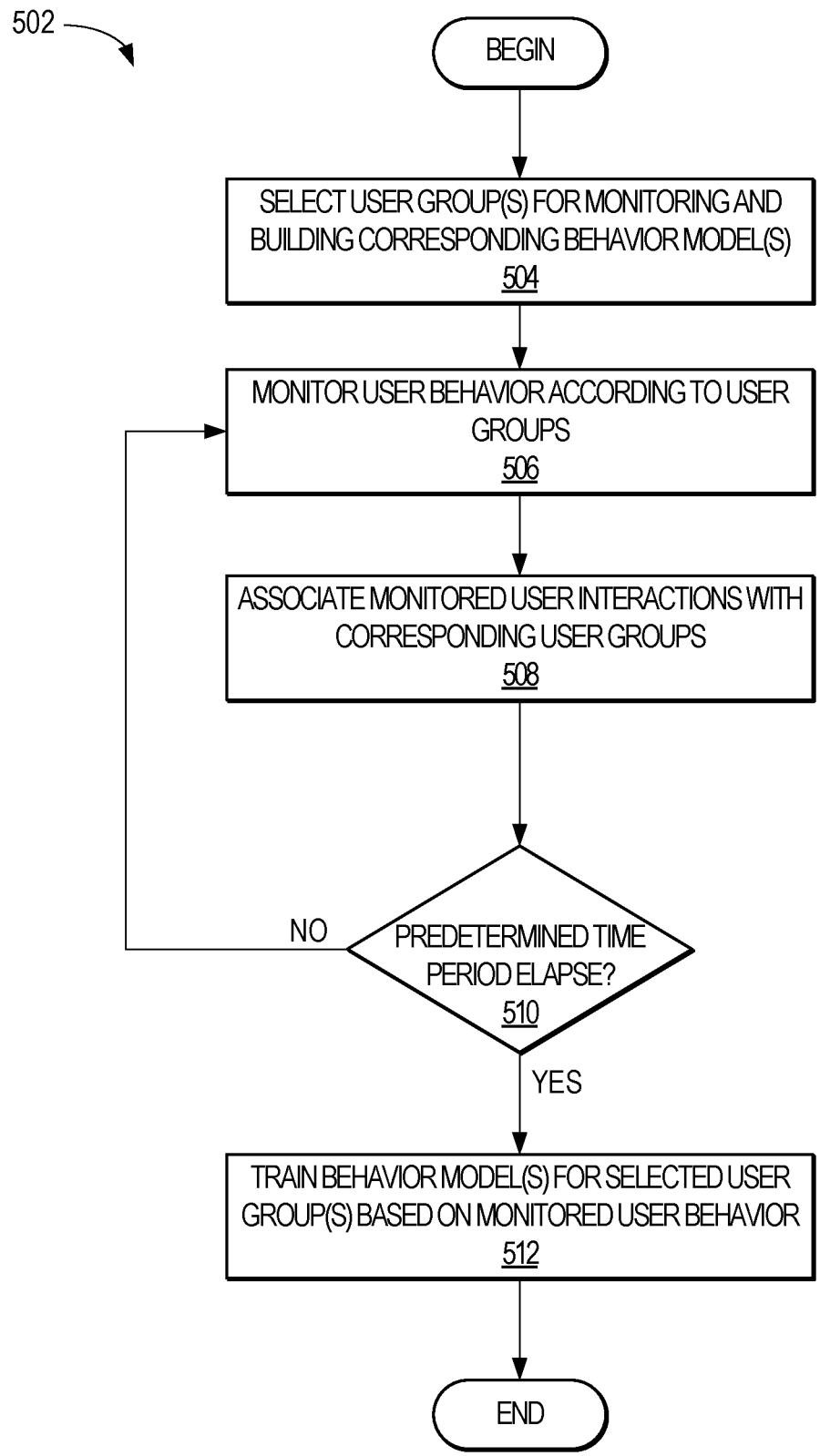
FIG. 5 illustrates a method, in accordance with an example embodiment, for training one or more behavior model(s) using monitored user interactions with the information management system of FIG. 3.

FIG. 5 illustrates a method 502, in accordance with an example embodiment, for training one or more behavior model(s) using monitored user interactions with the information management system of FIG. 3. The method 502 may be implemented by one or more of the devices or components illustrated in FIGS. 2-3, and is discussed by way of reference thereto.

Initially, and with reference to FIG. 3, the storage manager 304 begins the process of training and/or building one or more of the behavior model(s) 318. In training and/or building one or more of the behavior model(s) 318, the storage manager 304 may first determine the user group(s) that are managed by the information management system 302 (Operation 504). For example, the storage manager 304 may query the directory server 306 for a listing of the user group(s) 322 that are managed in the information management system 302. The storage manager 304 may then receive a list of the one or more user group(s) 322. In one embodiment, the storage manager 304 constructs a corresponding behavior model 318 for each of the user group(s) 322. In another embodiment, the storage manager 304 constructs a corresponding behavior model 318 for each user group 322 and for each combination of user group 322. In yet another embodiment, the storage manager 304 constructs a corresponding behavior model 318 for each user group 322 and then requests instructions for building other behavior model(s) 318 based on one or more combination(s) of the user group(s) 322 (e.g., by sending an e-mail or displaying a prompt to an administrator or operator of the information management system 302).

The storage manager 304 may then start the process of collecting sufficient training data 320 for training the various behavior model(s) 318. The training data 320 may indicate which files of the array data 328 and/or snapshot(s) 330 are likely to be used by users of the information management system 302. In one embodiment, the storage manager 304 collects training data 320 in the form of user interactions with one or more files of the storage array 308, such as those files that are part of the array data 328 and/or one or more snapshot(s) 330. For example, the storage manager 304 may be in communication with the storage array 308, where the storage array 308 communicates user interaction data to the storage manager 304. In one embodiment, the user interaction data includes a file that a user has interacted with, the location of the file, the type of interaction by the user, metadata associated with the file (e.g., obtained via snapshot index 326). The storage array 308 may communicate the user interaction data each time the user interacts with a file of the storage array 308.

The storage manager 304 may associate the user interaction data with one or more of the behavior model(s) 318 based on the user group of the user corresponding to the received user interaction data (Operation 508). In one embodiment, the storage manager 304 may query the directory server 306 with the user corresponding to the received user interaction data to obtain the one or more user group(s) 322 to which the user belongs. Using the obtained one or more user group(s) 322, the storage manager 304 may then associate the received user interaction data with the corresponding behavior model(s) 318. The storage manager 304 may maintain one or more data structures (e.g., a database, a flat file, an array, etc.) to maintain a record of the associations between the user interaction data and the corresponding behavior model(s) 318. The received user interaction data forms the basis for an initial set of the training data 320.

The storage manager 304 may then train one or more of the behavior model(s) 318 with the training data 320. In one embodiment, the storage manager 304 may train the one or more behavior model(s) 318 after a predetermined time period has elapsed and the storage manager 304 has collected user interaction data within the predetermined time period. The storage manager 304 may start the predetermined time period after creating the one or more behavior model(s) 318. The predetermined time period may be configurable by an administrator and/or operator of the information management system 302 and include such time periods as one day, one week, a month, six months, or any other measurable amount of time. The storage manager 304 may configured to keep track of the time for the predetermined time period (e.g., via a time counter, by computing a difference between a start date and a current date, etc.). Accordingly, in one embodiment, the method 502 may include the storage manager 304 determining whether the predetermined time period has elapsed (Operation 510).

Where the predetermined time period has not elapsed (e.g., the "NO" branch of Operation 510), the method 502 may return to Operation 506, where the storage manager 304 continues receiving user interaction data and/or monitoring user interactions with the files of the storage array 308, including those files that may be stored as part of the array data 328 and/or part of the accessible snapshot(s) 330. Where the predetermined time period has elapsed (e.g., the "YES" branch of Operation 510), the storage manager 304 may proceed to training the one or more behavior model(s) 318 with the collected training data 320. Additionally, and/or alternatively, the storage manager 304 may perform an additional determination (not shown) in determining whether the storage manager 304 has collected a sufficient amount of training data 320. In this regard, the storage manager 304 may be configured with a training data threshold that indicates an amount of training data 320 the storage manager 304 is to collect for each behavior model before training the behavior model with the collected training data 320. In one embodiment, the training data threshold includes a predetermined number of user interactions that the storage manager 304 is to collect for each behavior model (e.g., 5000 user interactions per behavior model). In another embodiment, the training data threshold is different for each behavior model, such that a first training data threshold may specify that there should be 5000 user interactions for one behavior model whereas a second training data threshold may specify that there should be 10000 user interactions for a second behavior model. The training data threshold may be configured by an administrator and/or operator of the information management system 302.

Where the predetermined time period has elapsed, and the storage manager 304 does not have a sufficient amount of training data 320, the method 502 may return to Operation 506 (e.g., similar to the "NO" branch of Operation 510). Where the predetermined time period has elapsed, and the storage manager 304 has a sufficient amount of training data, the method 502 may proceed to Operation 512 (e.g., similar to the "YES" branch of Operation 510). At Operation 512, the storage manager 304 trains the one or more behavior model(s) 318 using the collected training data 320. Although FIG. 5 illustrates that Operation 512 may be the last step in method 502, the storage manager 304 may iteratively perform Operations 506-512 such that the one or more behavior model(s) 318 are continuously trained and/or refined based on additional user interactions with the files of the storage array 308. In one embodiment, the number of iterations that the storage manager 304 performs is configured by an administrator and/or operator of the information management system 302. In another embodiment, the storage manager 304 performs method 502 until one or more of the behavior model(s) 318 output values having a threshold probability value and/or confidence value (e.g., the values output by the behavior model(s) 318 are 90% likely, 95% likely, 98% likely, and so forth). In this manner, FIG. 5 illustrates one implementation of training the behavior model(s) 318 of the storage manager 304 via one or more user interactions with the files of the storage array 308.

Figure 6:
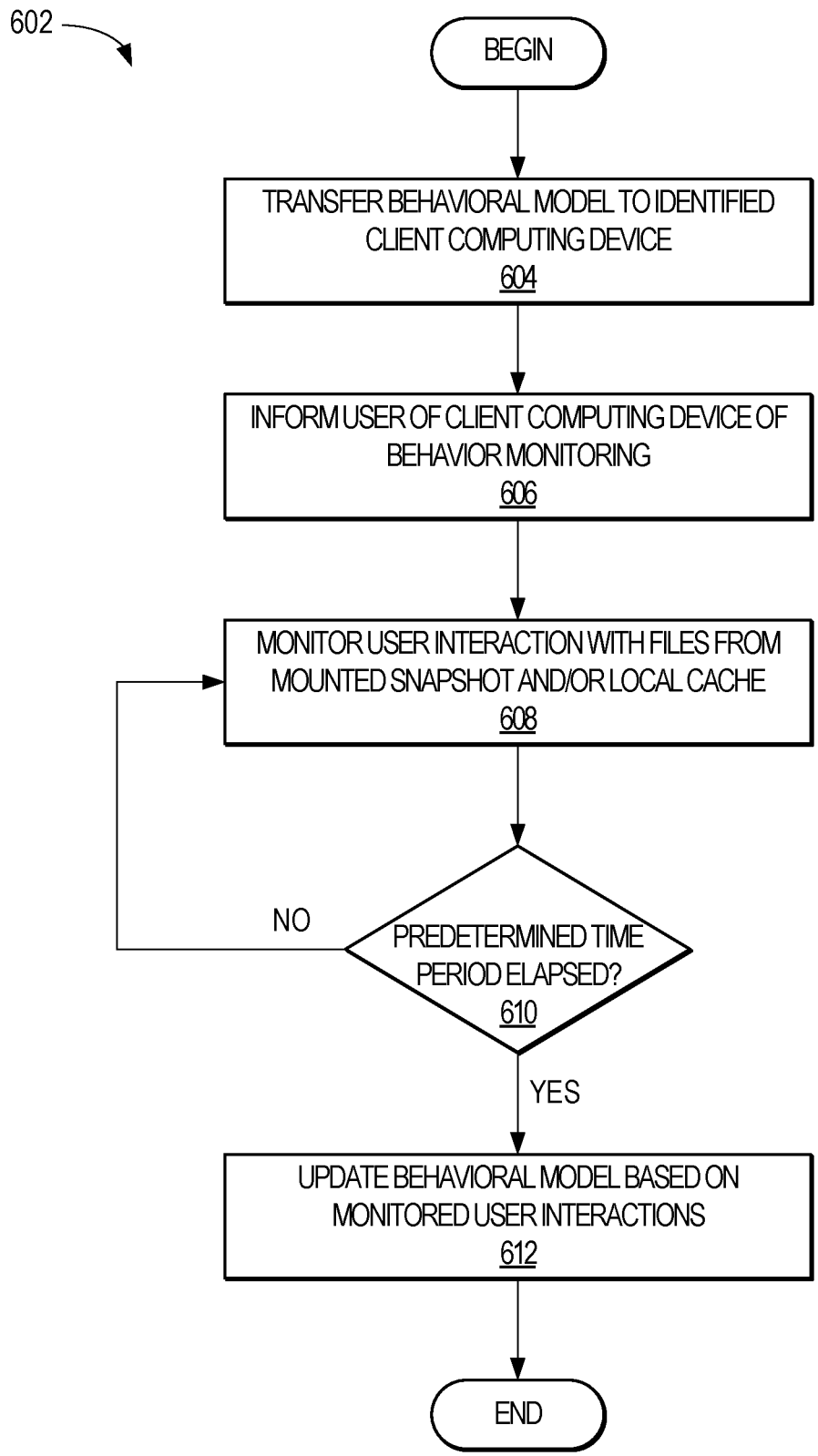
FIG. 6 illustrates a method, in accordance with an example embodiment, for training a behavior model that has been transferred to a client computing device of the information management system of FIG. 3.

FIG. 6 illustrates a method 602, in accordance with an example embodiment, for training a behavior model 424 that has been transferred to a client computing device (e.g., client computing device 310) of the information management system 302 of FIG. 3. the method 602 may be implemented by one or more of the devices and/or components illustrated in FIGS. 3-4, and is discussed by way of reference thereto. In the description accompanying FIG. 6, the focus is on the methodology of training a behavior model 318 to more accurately reflected a user's interactions with the storage array 308. Accordingly, some operations, such as transferring an initial group of files to the local cache 426, has been omitted for brevity and readability.

Initially, the storage manager 304 may transfer a behavior model selected from the behavior model(s) 318 to the client computing device 310 (Operation 604). The storage manager 304 may determine which of the behavior model(s) 318 to transfer to the client computing device 310 based on a user group to which a user of the client computing device 310 is assigned or associated with. For example, when the client computing device 310 connects to the information management system 302, the client computing device 310 may broadcast or announce its connection. The storage manager 304 may query for the user (e.g., the username and/or user identifier) of the client computing device 310, which the client computing device 310 may provide. The storage manager 304 may then query the directory server 306 for the user group(s) 322 to which the user belongs and/or is associated with based on the username and/or user identifier provided by the client computing device 310. The directory server 306 may then communicate the one or more user group(s) 322 to which the user belongs and/or is associated with to the storage manager 304, which may then use the returned user group(s) 322 to determine which of the behavior model(s) 318 to transfer to the client computing device 310.

As explained above, one or more of the behavior model(s) 318 may be associated with one or more of the user group(s) 322, and the storage manager 304 uses this association to determine which of the behavior model(s) 318 to transfer to the client computing device 310. In one embodiment, the storage manager 304 may transfer a single behavior model 18 to the client computing device 310. For example, the user may be associated with a primary user group, and the storage manager 304 transfers the behavior model that corresponds to this primary user group. In another embodiment, the user may belong to multiple user groups, and the storage manager 304 may transfer the behavior model to the client computing device 310 that is associated with user group(s) that match the user groups that the user of the client computing device 310 is associated with and/or belongs to.

The client computing device 310 may then inform the user that the user's interactions with the client computing device 310 and/or information management system 302 are being monitored (Operation 606). As discussed above, one or more application(s) 408 of the client computing device 310 may display a prompt and/or a message to the user informing the user that his or her interactions are being monitored for the purposes of effectively managing the local cache 426 of the client computing device 310. For example, the cache manager 416 and/or the behavior monitor 418 may be configured to display this prompt and/or message, and may request that the user agree to the monitoring. Where the user does not agree to the monitoring, the cache manager 416 and/or the behavior monitor 418 may not monitor the user's interactions with the storage array and may also disable functionalities and/or operations associated with the local cache 426.

Alternatively, where the user agrees to the monitoring, the behavior monitor 418 may then monitor user interactions with the files of the local cache 426 and/or the files of the mounted snapshot 420. As explained previously, the behavior monitor 418 may monitor such interactions as reading from a selected file, writing to a selected file, modifying the permissions of a selected file, deleting a selected file, and other such interactions with the files of a mounted snapshot 420 and/or the local cache 426, or combinations thereof.

In one embodiment, the behavior monitor 418 may retrain and/or update the behavior model 424 after a predetermined time period has elapsed and the behavior monitor 418 has collected a number of user interactions within the predetermined time period. An initial, or first, predetermined time period may start after the behavior model 424 has been copied to the client computing device 310. The predetermined time period of the behavior monitor 418 may be configurable by an administrator and/or operator of the information management system 302 and may include such time periods as one day, one week, a month, six months, or any other measurable amount of time. The behavior monitor 418 may be configured to keep track of the time for the predetermined time period (e.g., via a time counter, by computing a difference between a start date and a current date, etc.). Accordingly, in one embodiment, the method 602 may include the behavior monitor 418 determining whether the predetermined time period has elapsed (Operation 610).

Where the predetermined time period has not elapsed (e.g., the "NO" branch of Operation 610), the method 502 may return to Operation 608, where the behavior monitor 418 continues monitoring user interactions with the files of the storage array 308, including those files that may be stored as part of the local cache 426 and/or part of the mounted snapshot 420. Where the predetermined time period has elapsed (e.g., the "YES" branch of Operation 610), the behavior monitor 418 may proceed to training the one or more behavior model(s) 318 with the user interactions. Additionally, and/or alternatively, the behavior monitor 418 may perform an additional determination (not shown) in determining whether it has collected a sufficient amount of user interactions to retrain and/or refine the behavior model 424. In this regard, behavior monitor 418 may be configured with a user interaction threshold that indicates an amount of user interactions the behavior monitor 418 should before retraining and/or refining the behavior model 424. In one embodiment, the user interaction threshold indicates a predetermined number of user interactions that the behavior monitor 418 is to collect for the behavior model 424 (e.g., 5000 user interactions per behavior model). The user interaction threshold may be configured by an administrator and/or operator of the information management system 302.

Where the predetermined time period has elapsed, and the behavior monitor 418 does not have a sufficient amount of user interactions, the method 602 may return to Operation 608 (e.g., similar to the "NO" branch of Operation 610). Where the predetermined time period has elapsed, and the behavior monitor 418 has a sufficient amount of user interactions, the method 602 may proceed to Operation 612 (e.g., similar to the "YES" branch of Operation 610). At Operation 612, the behavior monitor 418 retrains and/or updates the behavior model 424 using the monitored user interactions. Although FIG. 6 illustrates that Operation 612 may be the last step in method 602, the behavior monitor 418 may iteratively perform Operations 608-612 such that the behavior model 424 is continuously updated and/or retrained based on additional user interactions with the files of the mounted snapshot 420 and/or the local cache 426. As the behavior model 424 may be constantly evolving and/or changing based on the files stored in the local cache 426, there may be no set number of iterations that the behavior monitor 418 performs for Operations 608-612. In this manner, FIG. 6 illustrates one implementation of retraining and/or updating the behavior model 424 of the client computing device 310 via one or more user interactions with the files of the mounted snapshot 420 and/or the local cache 426.

Figure 7A:
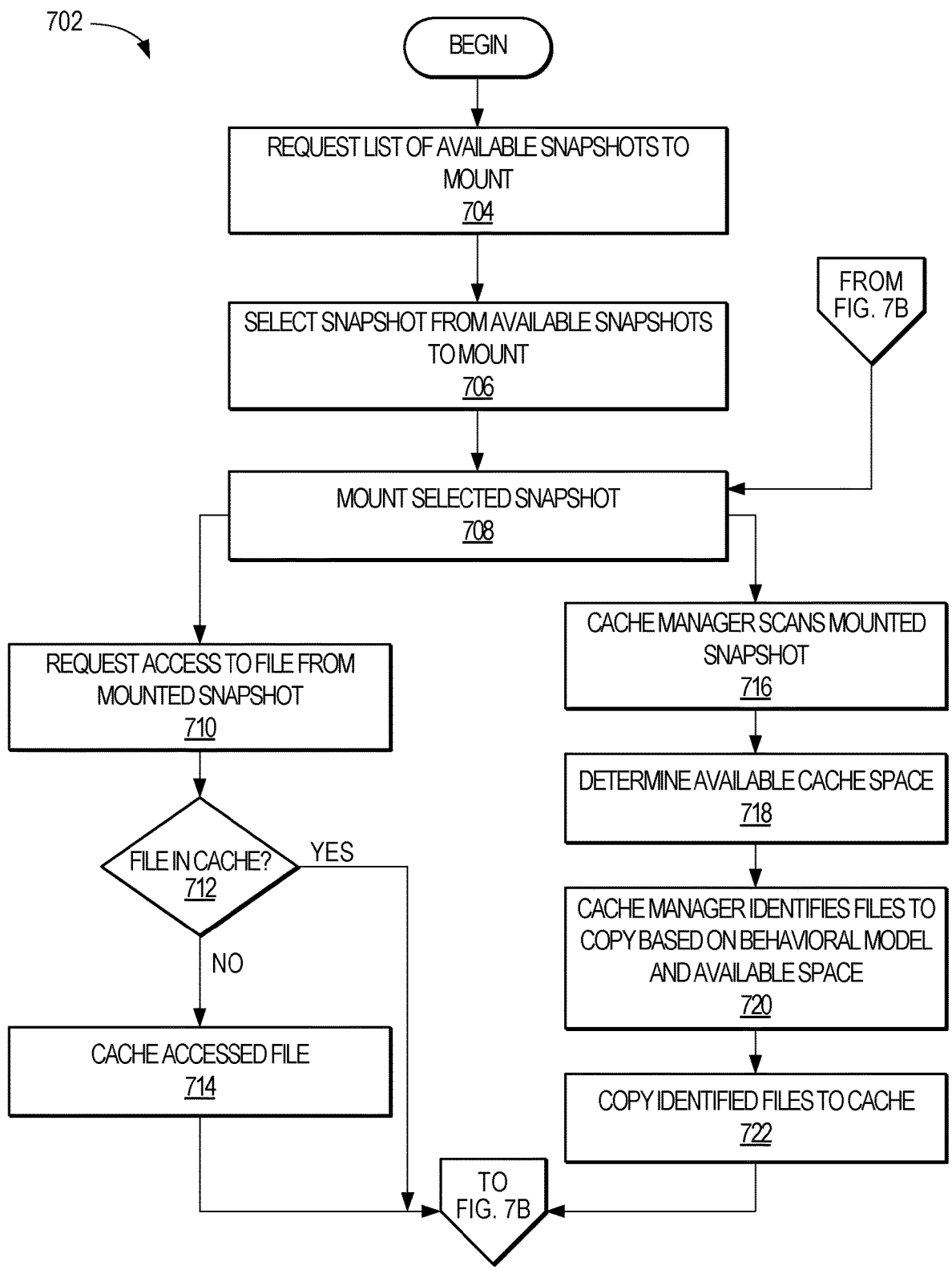
FIGS. 7A-7B illustrate a method, in accordance with an example embodiment, for intelligently managing a cache of a client computing device based on a behavior model.
Figure 7B:
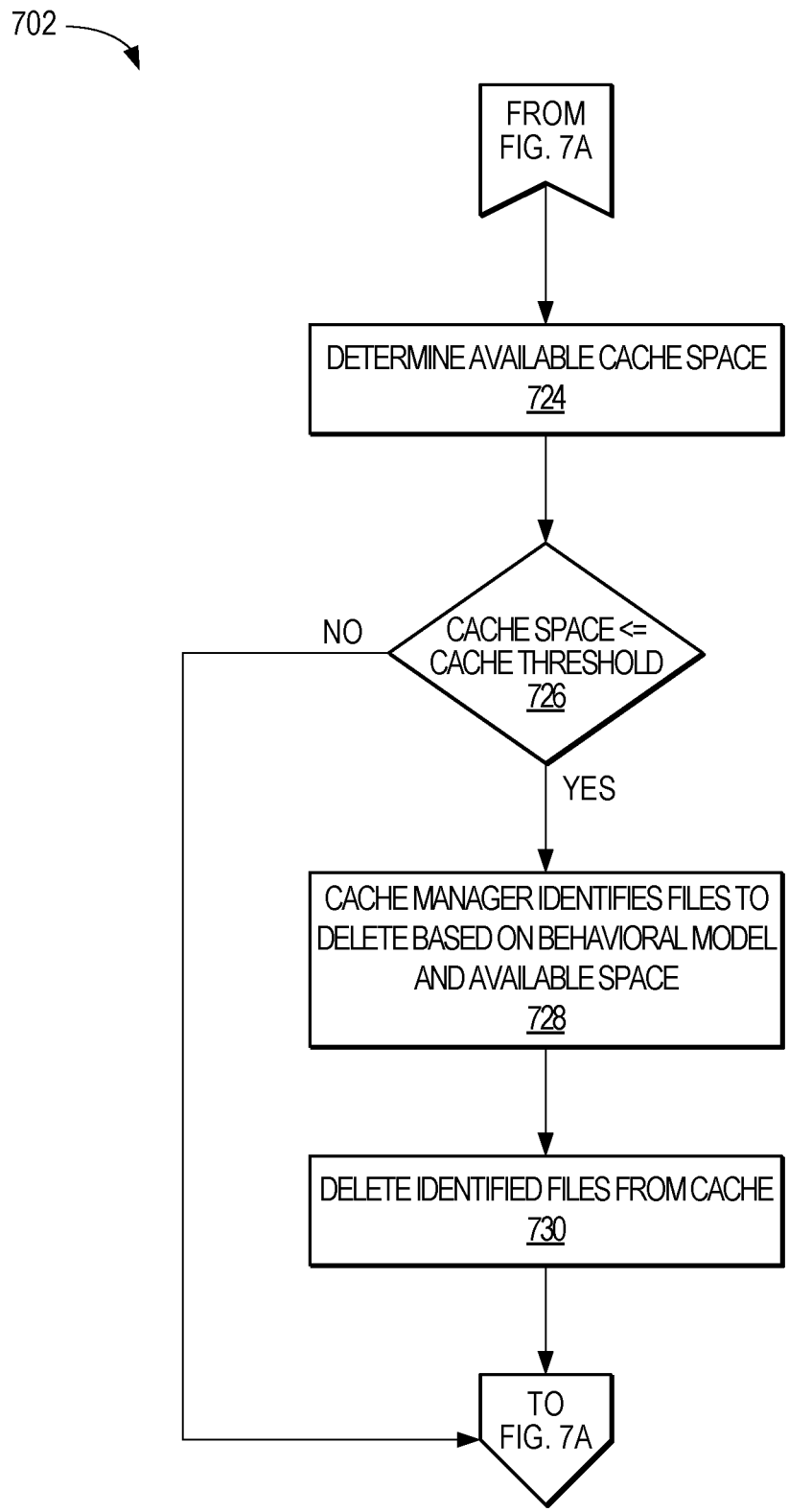

FIGS. 7A-7B illustrate a method 702, in accordance with an example embodiment, for intelligently managing a cache of a client computing device based on a behavior model. The method 702 may be implemented by one or more of the devices or components illustrated in FIGS. 2-3, and is discussed by way of reference thereto. In the implementation illustrated in FIG. 7A, the following description assumes that a behavior model (e.g., one or more of the behavior model(s) 318) has been transferred to a client computing device (e.g., client computing device 310) and stored as behavior model 424.

Referring initially to FIG. 7A, the client computing device 310 may mount one or more of the snapshots provided by the storage array 308. In this regard, the snapshot mounting module 412 may communicate a request to the storage array 308 to provide a listing of the available snapshot(s) (Operation 704). Upon receiving the request, the snapshot manager 324 may query the snapshot index 326 and obtain a listing of the available snapshot(s) 330 and information about each of the snapshot(s) 330 (e.g., provided by the snapshot index 326). The snapshot manager 324 may then communicate this listing to the client computing device 310 via one or more of the network(s) 316.

Upon receiving the listing of available snapshot(s), the snapshot mounting module 412 may display the listing via a user interface and/or display of the client computing device 310 (e.g., a graphical user interface, a command line user interface, and so forth). A user of the client computing device 310 may then select the snapshot to mount (Operation 706). In some instances, the snapshot mounting module 412 may automatically select a snapshot to mount, such as where the user provides one or more mounting parameters to the snapshot mounting module 412 that inform the snapshot mounting module 412 which of the available snapshots to mount. Examples of these parameters include, but are not limited to, a volume name, a pathname, a creation date, a modification date, an owner name, a username, and other such parameters or combinations thereof. The snapshot mounting module 412 may then mount the selected snapshot as mounted snapshot 420 (Operation 708).

Following Operation 708, the branches of method 702 may proceed simultaneously or at different times. For example, the branch continuing to Operation 710 may occur when a user attempts to access a file from the mounted snapshot 420, whereas the branch continuing to Operation 716 may proceed asynchronously relative to the branch continuing from Operation 710.

At Operation 710, the client computing device 310 may request access to a file from the mounted snapshot 420. The request to access the file may be a write request and/or a read request. For example, the developer application 414 may send a request to open a file provided by the mounted snapshot 420 and/or to make changes to the file. As explained above, the cache manager 416 may intercept the request to determine whether the requested file is stored in the local cache 426. By intercepting the request, the cache manager 416 may prevent the copy of the file stored in the mounted snapshot 420 from being accessed and, instead, redirect the read and/or write operation to a copy of the file stored in the local cache 426.

The cache manager 416 may then determine whether the requested file has been stored in the local cache 426 (Operation 712). Where the file has not been stored in the local cache 426 (e.g., the "NO" branch of Operation 712), the cache manager 416 may copy the requested file from the mounted snapshot 420 to the local cache 426, where the requesting application may then perform the requested operation on the copy of the file stored in the local cache 426 (Operation 714). Alternatively, where the file has been stored in the local cache 426 (e.g., the "YES" branch of Operation 712), the method 702 may proceed to Operation 724, where the method 702 continues and the cache manager 416 further determines the available cache space. In addition, where the method 702 proceeds to Operation 724 from Operation 712, the requesting application may perform the operation on the copy of the file already stored in the local cache 426.

Referring back to Operation 708, the method 702 may, at times, proceed to Operation 716, where the branch of operations proceeding from Operation 708 involve the determination of which files to copy from the mounted snapshot 420 to the local cache 426. The cache manager 416 may perform the set of operations along the branch starting with Operation 716 where an initial set of files are to be copied from the mounted snapshot 420 to the local cache 426. This may occur where the behavior model is initially copied from the storage manager 304 to the client computing device 310. This may also occur when the stored behavior model 424 undergoes an update and/or retraining, which may lead the cache manager 416 to determine a different set of files to copy from the mounted snapshot 420 to the local cache 426.

At Operation 716, the cache manager 416 may scan the mounted snapshot 420 to build a list of potential files to copy from the mounted snapshot 420 to the local cache 426. The cache manager 416 may then determine an amount of free space available in the local cache 426 (Operation 718). Where files have yet to be stored in the local cache 426, the amount of free space available in the local cache 426 may include the entirety of the local cache 426 discounted by a cache threshold amount. In other instances, where files already exist in the local cache 426, the amount of free space available will be dependent on the amount of storage space that the files in the local cache 426 already consume.

Based on the determined available space, the cache manager 416 then determines which files from the mounted snapshot 420 to copy to the local cache 426 (Operation 720). In one embodiment, the cache manager 416 uses the stored behavioral model 424 to assist in this determination. In particular, the cache manager 416 may input the amount of available free space in the local cache 426 and the previously scanned list of files from the mounted snapshot 420 to the behavior model 424. As the behavior model 424 has already been trained to identify which files are likely to be used by the user of the client computing device 310, the behavior model 424 may then output a set of files that the cache manager 416 is to copy from the mounted snapshot 420 to the local cache 426. Accordingly, at Operation 722, the cache manager 416 may then copy the identified files from the mounted snapshot 420 to the local cache 426. The method 702 may then proceed to Operation 724 illustrated in FIG. 7B.

Referring next to FIG. 7B, the cache manager 416 proceeds to determine the available space and/or remaining available space in the local cache 426. As discussed above, the cache manager 416 may determine an amount of available space in the local cache 426 for storing one or more files (Operation 724). The cache manager 416 may perform Operation 724 at any point during which the local cache 426 is in use or inactive. In determining the available cache space, the cache manager 416 may query an operating system of the client computing device 310 and/or traverse the file system in which the local cache 426 was instantiated.

The cache manager 416 then determines whether the available cache space is within a cache threshold (Operation 726). As discussed above, the cache threshold may cache threshold value indicate the amount of cache space the files from the list of identified files should occupy Having a cache threshold ensures that there is additional space in the event that the cache manager 416 is required to copy a file from the mounted snapshot 420 or in the event that an application uses space in the local cache 426 without prior authorization and/or permission from the cache manager 416. If there is insufficient space in the local cache 426 to copy one or more files from the mounted snapshot 420 and/or to write additional data to one or more files already stored in the local cache 426 (e.g., the "YES" branch of Operation 726), then the cache manager 416 proceeds to free up space within the local cache 426. Alternatively, if there is sufficient space in the local cache 426 to store one or more files from the mounted snapshot 420 and/or to write additional data to one or more files within the local cache 426 (e.g., the "NO" branch of Operation 726), then the method 702 may return to Operation 708, where the cache manager 416 waits for another snapshot to be mounted (e.g., for Operation 708 to occur) and/or a request to access a file originally stored in a mounted snapshot 420 (e.g., for Operation 710 to occur).

Furthermore, should the method 702 return to Operation 708, it should be understood that other Operations in method 702 may occur asynchronously and/or in response to certain events occurring within the client computing device 310. For example, the cache manager 416 may perform one or more operations associated with the branch starting with Operation 716 in response to an event (e.g., the mounting of a selected snapshot), a user request (e.g., for the cache manager 416 to evaluate the available space in the local cache 426), at the expiration of a timer (e.g., the cache manager 416 performs one or more operations at predetermined time intervals), or in response to other such events or conditions. Combinations of the foregoing are also contemplated as falling within the scope of this disclosure.

Referring back to Operation 726, should the cache manager 416 determine that there is insufficient space in the local cache 426 for storing one or more files and/or for writing additional data to one or more files already in the local cache 426 (e.g., the "YES" branch of Operation 726), the method 702 may proceed to Operation 728, where the cache manager 416 determines which files to remove from the local cache 426. As explained above, the cache manager 416 may employ one or more memory management techniques for freeing used space in the local cache 426. In the embodiment shown in FIG. 7B, the cache manager 416 may use the stored behavior model 424 to determine which of the files to remove from the local cache 426. In addition, the cache manager 416 and/or the behavior model 424 may leverage one or more priority values assigned to the files in the local cache 426 to determine which of the files to remove and/or which files to keep. For example, the behavior model 424 may be configured to output a listing of those files that should remain in the local cache 426. In another embodiment, the behavior model 424 may be configured to output a listing of those files that should be removed from the local cache 426 (e.g., where such files are identified as files to remove 430). As also explained previously, the behavior model 424 may determine which files to remove and/or which files to keep based on previously monitored user behavior of a user of the client computing device 310, where such user behavior may be monitored and/or logged by the behavior monitor 418.

After the behavior model 424 and/or the cache manager 416 determines which files to remove from the local cache 426, the cache manager 416 may then delete the identified files (Operation 730). In some implementations, the cache manager 416 may determine whether a file to be deleted should be synchronized with the version stored in the mounted snapshot 420 and, if so, whether such synchronization has been performed. In one embodiment, where a file to be deleted has been identified as requiring a synchronization with its counterpart in the mounted snapshot 420, the cache manager 416 may attempt to perform the synchronization. If the cache manager 416 cannot perform the synchronization (e.g., in the event there is no connection between the client computing device 310 and the storage array 308), the cache manager 416 may keep the local cache 426 and instruct the behavior model 424 to select additional and/or alternative files to remove. However, if the cache manager 416 can perform the synchronization between the file-to-be-removed and its counterpart stored in the mounted snapshot 420, the cache manager 416 may perform the synchronization, and then delete the file (e.g., as was identified by the behavior model 424).

After deleting one or more files from the local cache 426, the method 702 may return to Operation 708 as shown on FIG. 7A. However, as discussed above, it should be understood that returning to Operation 708 does not necessarily imply that the method 702 is performed again as shown in FIG. 7A. In fact, the cache manager 416 may remain inactive until an event and/or condition occurs that requires attention by the cache manager 416 (e.g., a new snapshot is mounted, a previously mounted snapshot is unmounted, a request to access a file is submitted, etc.). Accordingly, illustrating that the method 702 returns to Operation 708 is provided for the benefit of the reader, but one of ordinary skill in the art will appreciate that the Operations illustrated in any of the Figures disclosed herein may occur asynchronously, simultaneously, or out-of-order as shown in the accompanying Figures.

Figure 8:
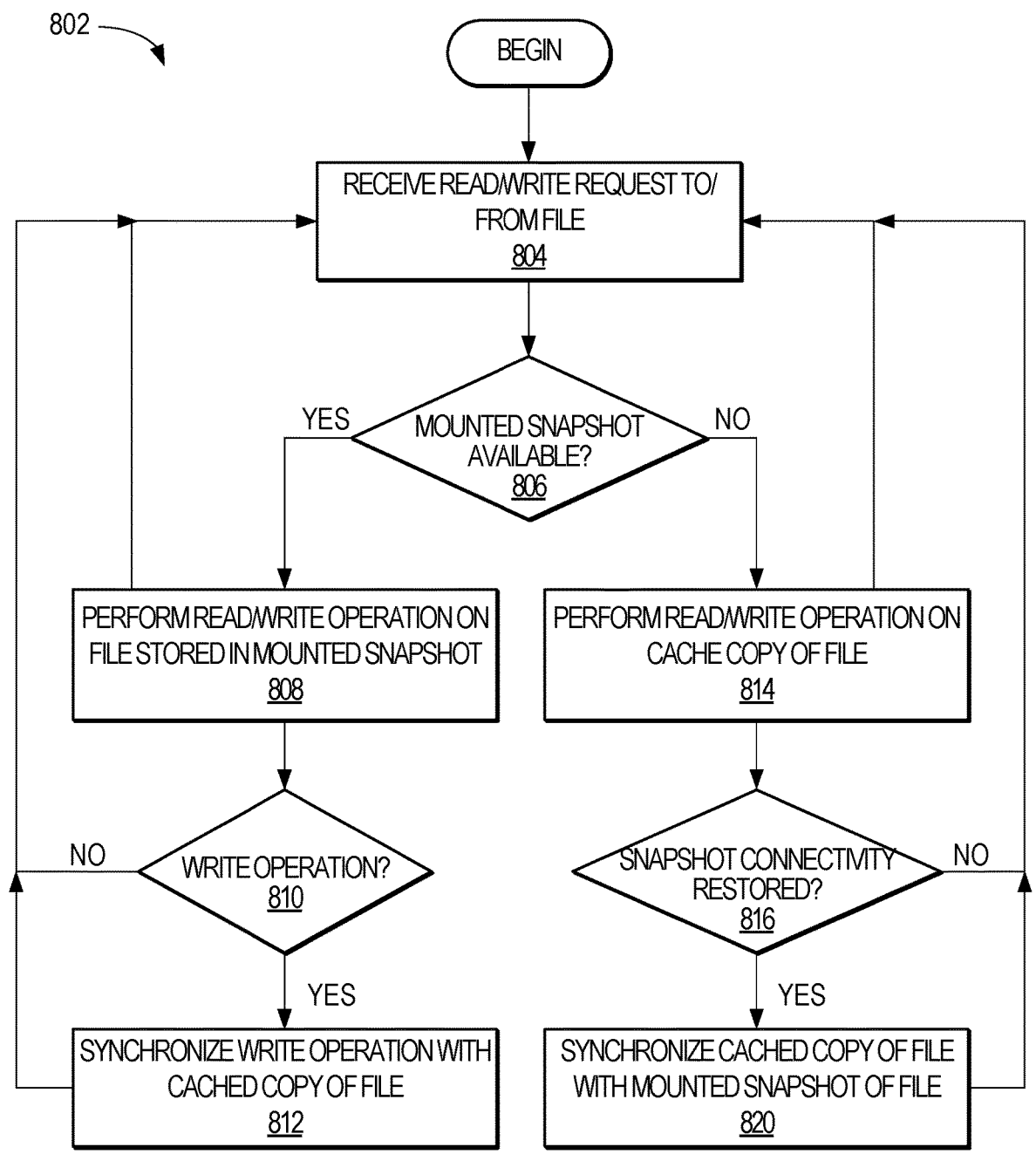
FIG. 8 illustrates a method, in accordance with an example embodiment, for synchronizing files stored in a cache of a client computing device with corresponding versions stored in a storage array of the information management system.

Referring next to FIG. 8, is an illustration of a method 802, in accordance with an example embodiment, for synchronizing files stored in the local cache 426 of the client computing device 310 with corresponding versions stored in a mounted snapshot 420 and/or the storage array 308 The method 802 may be implemented by one or more of the devices or components illustrated in FIGS. 2-3, and is discussed by way of reference thereto.

In one embodiment, the cache manager 416 is responsible for performing synchronizations between the local cache 426 and the mounted snapshot 420. Accordingly, the cache manager 416 may intercept (e.g., receive) a read and/or write request for a file (Operation 804). The file may be one that originated from the mounted snapshot 420, where a copy of such file resides in the local cache 426. Alternatively, the file may be located in the mounted snapshot 420. In either scenario, the cache manager 416 intercepts the read and/or write operation and determines whether the mounted snapshot 420 corresponding to the location of the file is available (Operation 806).

Where the cache manager 416 determines that the mounted snapshot 420 is available (e.g., the "YES" branch of Operation 806), the method 802 proceeds to Operation 808. Alternatively, where the cache manager 416 determines that the mounted snapshot 420 is not available (e.g., the "NO" branch of Operation 806), the method 802 proceeds to Operation 814. In one implementation, the cache manager 416 may determine whether the mounted snapshot 420 is available by attempting to send a communication packet (e.g., a "ping" or other type of communication) to the storage array 308 that hosts the mounted snapshot 420, and waiting for an acknowledgment reply from the storage array 308. An acknowledgment reply from the storage array 308 signals to the cache manager 416 that the mounted snapshot is available. In determining that the mounted snapshot 420 is not available, the cache manager 416 may implement a reply timeout timer which, when it expires, signals to the cache manager 416 that the storage array 308 and/or the mounted snapshot 420 is not available. Other implementations for determining whether the mounted snapshot 420 is available are also contemplated as falling within the scope of this disclosure and include, but are not limited, attempting to write a sample or test file to the mounted snapshot, attempting to send a communication packet to another device within the information management system 302 via the one or more network(s) 316, and other such implementations or combinations thereof.

Referring first to Operation 808, where the mounted snapshot 420 is available, the cache manager 416 may determine to perform the read and/or write operation on the copy of the file stored in the mounted snapshot 420. In this regard, the read and/or write operations may be considered to be performed on the "live" version of the file, rather than the cached version of the same file. The cache manager 416 then determines whether the operation being performed is a read operation or a write operation (Operation 810). The cache manager 416 performs this determination because a write operation may affect the file stored in the local cache 426, where as a read operation may not. Accordingly, where the cache manager 416 determines that a write operation is being performed (e.g., the "YES" branch of Operation 810), the method 802 may proceed to Operation 812. Alternatively, where the cache manager 416 determines that a read operation is being performed (e.g., the "NO" branch of Operation 810), the method 802 may include the cache manager 416 allowing the operation to occur (e.g., the developer application 414 reads from the file stored in the mounted snapshot 420), and then the method 802 may return to Operation 804, where the cache manager 416 waits for the next requested operation on the same file or another file.

At Operation 812, the cache manager 416 may synchronize the copy of the file stored in the local cache 426 with its counterpart stored in the mounted snapshot 420. In this regard, the cache manager 416 may copy the most recent changed version of the file from one location to another location, depending on which copy of the file is the most recent changed version. In another embodiment, the cache manager 416 may only copy those blocks of the file that have changed at location relative to the same blocks of the same file at the other location. Accordingly, in one embodiment, the synchronization of the write operation may include copying the changed from the mounted snapshot 420 to the local cache 426, and overwriting any prior copies of the file stored in the local cache 426 with the most recent changed copy stored in the mounted snapshot 420. Alternatively, the synchronization may include copying changed and/or updated blocks of the changed file from the mounted snapshot 420 to corresponding blocks of the file stored in the local cache 426. The method 802 may then return to Operation 804, where the cache manager 416 waits for another read and/or write operation request.

Referring back to Operation 806, the cache manager 416 may determine that the mounted snapshot 420 is not available or reachable (e.g., the "NO" branch of Operation 806). In this regard, the cache manager 416 may perform the read and/or write operation on the copy of the file stored in the local cache 426. As the cache manager 416 is configured to intercept read and/or write requests to files of the mounted snapshot 420, a user of the client computing device 310 may be unaware that the file from the mounted snapshot 420 is not available. Accordingly, read and/or write operations performed on the file may be transparent to the user and may appear as if such read and/or write operations are being performed on the copy of the file stored in the mounted snapshot 420.

After performing the read and/or write operation on the file stored in the local cache 426, the cache manager 416 may determine whether connectivity has been restored between the client computing device 310 and the mounted snapshot 420 (Operation 816). Although shown as being performed after a read and/or write operation to a file stored in the local cache 426, the determination of whether connectivity has been restored may be performed asynchronously, simultaneously, or at other times during method 802. The cache manager 416 may perform the determination of connectivity restoration as previously described above (e.g., sending a communication packet, attempting to write to a sample file, etc.).

Where the cache manager 416 determines that connectivity has not been restored (e.g., the "NO" branch of Operation 816), the method 802 may return to Operation 804, where the cache manager 416 waits for the next read and/or write operation. Alternatively, where the cache manager 416 determines that connectivity has been restored (e.g., the "YES" branch of Operation 816), the cache manager 416 may then synchronize the cached copy of the file with the copy of the file stored in the mounted snapshot 420 (Operation 820). The method 802 may then return to Operation 804 as previously described.

In this way, this disclosure provides an information management system with a client computing device that intelligently manages a local cache of the client computing device via one or more trained behavior models. A storage manager of the information management system may monitor user interactions with files managed by the information management system, and collect these user interactions for training the one or more behavior models. Because the storage manager uses actual user interactions in training the behavior models, the behavior models more accurately reflect actual user interactions rather than theoretical or simulated actions. In addition, a behavior model may be copied to a client computing device, where the behavior model may undergo additional refinements and/or retraining based on a user's interactions with files from the information management system. Through these refinements and/or retraining, the copied behavior model better reflects the actions and likely interactions by the user of the client computing device. This knowledge and information can be used to better manage a local cache of the client computing device of files copied from the information management system, where the behavior model can better predict which files are likely to be used by the user of the client computing device and which files can be safely deleted from the local cache. These types of improvements are particularly applicable in instances where a network connection between the client computing device and the information management system is unstable or unreliable. Because the behavior model predicts which files the user of the client computing device is likely to need and/or use, these files can be stored and/or maintained in the local cache, where the user has access to such files in the event the network connection between the client computing device and information management system is interrupted.

Example Embodiments

Some example enumerated embodiments of the present invention are recited in this section in the form of methods, systems, and non-transitory computer-readable media, without limitation. In one embodiment, this disclosure describes a method for managing a cache of a client computing device based on a trained behavior model. in one embodiment, the method includes receiving, at a client computing device, a behavior model corresponding to a user group associated with a user of the client computing device, wherein the behavior model has been trained with monitored user interactions of one or more files associated with the user group and mounting a snapshot of a file system provided by an information management system in communication with the client computing device, wherein the file system comprises one or more files. The method may also include determining, based on the behavior model, which of the one or more files of the file system of the mounted snapshot to transfer to a cache locally accessible by the client computing device and transferring the determined one or more files to the cache locally accessible by the client computing device. Furthermore, the method may include determining whether the mounted snapshot is accessible and in response to a determination that the mounted snapshot is not accessible, selectively deleting, based on the behavior model, one or more of the files stored in the cache locally accessible by the client computing device. In some instances, where there is a determination that the mounted snapshot is accessible, the method may include continuously monitor user interactions with the file system of the mounted snapshot, and updating the one or more files of the cache locally accessible by the client computing device based on the continuous user interactions that have been monitored.

In another embodiment of the method, the method includes accessing a file of the one or more files of the mounted system, determining whether the access file is already stored in the cache locally accessible by the client computing device, and transferring the accessed file to the cache locally accessible by the client computing device based on a determination that the accessed file is not already stored in the cache.

In a further embodiment of the method, the method includes monitoring user interactions of files of the user of the client computing device, and updating the behavior model based on the monitored user interactions.

In yet another embodiment of the method, the method includes determining an available space in the cache locally accessible by the client computing device and selectively deleting the one or more files stored in the cache is further based on the determined available space.

In yet a further embodiment of the method, the method includes determining whether an operation performed by the client computing device is a write operation on a file of the one or more files of the mounted snapshot, and based on a determination that the operation is a write operation, performing the write operation on the file of the one or more files of the mounted snapshot. The method may also include synchronizing the write operation with a cached copy of the file in the cache locally accessible by the client computing device.

In another embodiment of the method, the method may include determining that connectivity to the mounted snapshot has been severed, and in response to the determination that the connectivity to the mounted snapshot has been severed, redirecting operations on the file of the one or more files of the mounted snapshot to a cache copy of the file stored in the cache locally accessible by the client computing device.

In a further embodiment of the method, the method includes determining that connectivity has been restored to the mounted snapshot, and synchronizing the cache copy of the file with the file of the one or more files of the mounted snapshot.

This disclosure further describes a system for managing a cache of a client computing device based on a trained behavior model. In one embodiment, the system includes one or more non-transitory, computer-readable media having computer-executable instructions stored thereon, and one or more processors that, having executed the computer-executable instructions, configure a system to perform a plurality of operations comprising receiving a behavior model corresponding to a user group associated with a user of the client computing device, wherein the behavior model has been trained with monitored user interactions of one or more files associated with the user group. The plurality of operations may also include mounting a snapshot of a file system provided by an information management system in communication with the client computing device, wherein the file system comprises one or more files and determining, based on the behavior model, which of the one or more files of the file system of the mounted snapshot to transfer to a cache locally accessible by a client computing device. The plurality of operations may further include transferring the determined one or more files to the cache locally accessible by the client computing device and determining whether the mounted snapshot is accessible. In response to a determination that the mounted snapshot is not accessible, the plurality of operations may include selectively deleting, based on the behavior model, one or more of the files stored in the cache locally accessible by the client computing device. In response to a determination that the mounted snapshot is accessible, the plurality of operations may include continuously monitor user interactions with the file system of the mounted snapshot, and updating the one or more files of the cache locally accessible by the client computing device based on the continuous user interactions that have been monitored.

In another embodiment of the system, the plurality of operations further comprises accessing a file of the one or more files of the mounted system, determining whether the access file is already stored in the cache locally accessible by the client computing device, and transferring the accessed file to the cache locally accessible by the client computing device based on a determination that the accessed file is not already stored in the cache.

In a further embodiment of the system, the plurality of operations further comprises monitoring user interactions of files of the user of the client computing device, and updating the behavior model based on the monitored user interactions.

In yet another embodiment of the system, the plurality of operations further comprises determining an available space in the cache locally accessible by the client computing device, and wherein selectively deleting the one or more files stored in the cache is further based on the determined available space.

In yet a further embodiment of the system, the plurality of operations further comprises determining whether an operation performed by the client computing device is a write operation on a file of the one or more files of the mounted snapshot. In addition, based on a determination that the operation is a write operation, the plurality of operations may also include performing the write operation on the file of the one or more files of the mounted snapshot and synchronizing the write operation with a cached copy of the file in the cache locally accessible by the client computing device.

In another embodiment of the system, the plurality of operations further comprises determining that connectivity to the mounted snapshot has been severed, and in response to the determination that the connectivity to the mounted snapshot has been severed, redirecting operations on the file of the one or more files of the mounted snapshot to a cache copy of the file stored in the cache locally accessible by the client computing device.

In a further embodiment of the system, the plurality of operations further comprises determining that connectivity has been restored to the mounted snapshot, and synchronizing the cache copy of the file with the file of the one or more files of the mounted snapshot.

This disclosure further provides for a non-transitory, computer-readable media having computer-executable instructions stored thereon that, when executed by one or more processors, configure a system to perform a plurality of operations. The plurality of operations may include receiving a behavior model corresponding to a user group associated with a user of the client computing device, wherein the behavior model has been trained with monitored user interactions of one or more files associated with the user group and mounting a snapshot of a file system provided by an information management system in communication with the client computing device, wherein the file system comprises one or more files. The plurality of operations may also include determining, based on the behavior model, which of the one or more files of the file system of the mounted snapshot to transfer to a cache locally accessible by the client computing device and transferring the determined one or more files to the cache locally accessible by the client computing device. The plurality of operations may further include determining whether the mounted snapshot is accessible. In response to a determination that the mounted snapshot is not accessible, the plurality of operations may also include selectively deleting, based on the behavior model, one or more of the files stored in the cache locally accessible by the client computing device. In response to a determination that the mounted snapshot is accessible, the plurality of operations may include continuously monitor user interactions with the file system of the mounted snapshot and updating the one or more files of the cache locally accessible by the client computing device based on the continuous user interactions that have been monitored.

In another embodiment of the non-transitory, computer-readable media, the plurality of operations further includes accessing a file of the one or more files of the mounted system, determining whether the access file is already stored in the cache locally accessible by the client computing device, and transferring the accessed file to the cache locally accessible by the client computing device based on a determination that the accessed file is not already stored in the cache.

In a further embodiment of the non-transitory, computer-readable media, the plurality of operations further comprises monitoring user interactions of files of the user of the client computing device, and updating the behavior model based on the monitored user interactions.

In yet another embodiment of the non-transitory, computer-readable media, the plurality of operations further comprises determining an available space in the cache locally accessible by the client computing device, and wherein selectively deleting the one or more files stored in the cache is further based on the determined available space.

In yet a further embodiment of the non-transitory, computer-readable media, the plurality of operations further comprises determining whether an operation performed by the client computing device is a write operation on a file of the one or more files of the mounted snapshot, and based on a determination that the operation is a write operation, performing the write operation on the file of the one or more files of the mounted snapshot, and synchronizing the write operation with a cached copy of the file in the cache locally accessible by the client computing device.

In another embodiment of the non-transitory, computer-readable media, the plurality of operations further comprises determining that connectivity to the mounted snapshot has been severed. In response to the determination that the connectivity to the mounted snapshot has been severed, the plurality of operations also includes redirecting operations on the file of the one or more files of the mounted snapshot to a cache copy of the file stored in the cache locally accessible by the client computing device.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

We claim:

1. A method for managing a cache of a client computing device based on a trained behavior model, the method comprising:
   receiving, at a client computing device, a behavior model corresponding to a user group associated with a user of the client computing device, wherein the behavior model has been trained with monitored user interactions of one or more files associated with the user group;
   mounting a snapshot of a file system provided by an information management system in communication with the client computing device, wherein the file system comprises one or more files;
   determining, based on the behavior model, which of the one or more files of the file system of the mounted snapshot to transfer to a cache locally accessible by the client computing device;
   transferring the determined one or more files to the cache locally accessible by the client computing device;
   determining whether the mounted snapshot is accessible;
   in response to a determination that the mounted snapshot is not accessible:
      selectively deleting, based on the behavior model, one or more of the files stored in the cache locally accessible by the client computing device; and
   in response to a determination that the mounted snapshot is accessible:
      continuously monitoring user interactions with the file system of the mounted snapshot, and
      updating the one or more files of the cache locally accessible by the client computing device based on the monitored user interactions.

2. The method of claim 1, further comprising:
   accessing a file of the one or more files of the mounted snapshot;
   determining whether the accessed file is already stored in the cache locally accessible by the client computing device; and
   transferring the accessed file to the cache locally accessible by the client computing device based on a determination that the accessed file is not already stored in the cache.

3. The method of claim 1, further comprising:
   monitoring user interactions of files of the user of the client computing device; and
   updating the behavior model based on the monitored user interactions.

4. The method of claim 1, further comprising:
   determining an available space in the cache locally accessible by the client computing device; and wherein selectively deleting the one or more files stored in the cache is further based on the determined available space.

5. The method of claim 1, further comprising:
   determining whether an operation performed by the client computing device is a write operation on a file of the one or more files of the mounted snapshot; and
   based on a determination that the operation is a write operation:
      performing the write operation on the file of the one or more files of the mounted snapshot; and
      synchronizing the write operation with a cached copy of the file in the cache locally accessible by the client computing device.

6. The method of claim 1, further comprising:
   determining that connectivity to the mounted snapshot has been severed; and
   in response to the determination that the connectivity to the mounted snapshot has been severed, redirecting operations on the file of the one or more files of the mounted snapshot to a cache copy of the file stored in the cache locally accessible by the client computing device.

7. The method of claim 6, further comprising:
   determining that connectivity has been restored to the mounted snapshot; and
   synchronizing the cache copy of the file with a copy of the file stored in the mounted snapshot.

8. A system for managing a cache of a client computing device based on a trained behavior model, the system comprising:
   one or more non-transitory, computer-readable media having computer-executable instructions stored thereon; and,
   one or more processors that, having executed the computer-executable instructions, configure a system to perform a plurality of operations comprising
      receiving a behavior model corresponding to a user group associated with a user of a client computing device, wherein the behavior model has been trained with monitored user interactions of one or more files associated with the user group;
      mounting a snapshot of a file system provided by an information management system in communication with the client computing device, wherein the file system comprises one or more files;
      determining, based on the behavior model, which of the one or more files of the file system of the mounted snapshot to transfer to a cache locally accessible by a client computing device;
      transferring the determined one or more files to the cache locally accessible by the client computing device;
      determining whether the mounted snapshot is accessible;
      in response to a determination that the mounted snapshot is not accessible:
         selectively deleting, based on the behavior model, one or more of the files stored in the cache locally accessible by the client computing device; and
      in response to a determination that the mounted snapshot is accessible:
         continuously monitor user interactions with the file system of the mounted snapshot, and
         updating the one or more files of the cache locally accessible by the client computing device based on the monitored user interactions.

9. The system of claim 8, wherein the plurality of operations further comprises:
   accessing a file of the one or more files of the mounted snapshot;

determining whether the access file is already stored in the cache locally accessible by the client computing device; and transferring the accessed file to the cache locally accessible by the client computing device based on a determination that the accessed file is not already stored in the cache.

10. The system of claim 8, wherein the plurality of operations further comprises:

monitoring user interactions of files of the user of the client computing device; and updating the behavior model based on the monitored user interactions.

11. The system of claim 8, wherein the plurality of operations further comprises:

determining an available space in the cache locally accessible by the client computing device; and wherein selectively deleting the one or more files stored in the cache is further based on the determined available space.

12. The system of claim 8, wherein the plurality of operations further comprises:

determining whether an operation performed by the client computing device is a write operation on a file of the one or more files of the mounted snapshot; and based on a determination that the operation is a write operation:

performing the write operation on the file of the one or more files of the mounted snapshot; and synchronizing the write operation with a cached copy of the file in the cache locally accessible by the client computing device.

13. The system of claim 8, wherein the plurality of operations further comprises:

determining that connectivity to the mounted snapshot has been severed; and in response to the determination that the connectivity to the mounted snapshot has been severed, redirecting operations on the file of the one or more files of the mounted snapshot to a cache copy of the file stored in the cache locally accessible by the client computing device.

14. The system of claim 13, wherein the plurality of operations further comprises:

determining that connectivity has been restored to the mounted snapshot; and synchronizing the cache copy of the file with the file of the one or more files of the mounted snapshot.

15. A non-transitory, computer-readable media having computer-executable instructions stored thereon that, when executed by one or more processors, configure a system to perform a plurality of operations comprising:

receiving a behavior model corresponding to a user group associated with a user of a client computing device, wherein the behavior model has been trained with monitored user interactions of one or more files associated with the user group;

mounting a snapshot of a file system provided by an information management system in communication with the client computing device, wherein the file system comprises one or more files;

determining, based on the behavior model, which of the one or more files of the file system of the mounted snapshot to transfer to a cache locally accessible by the client computing device;

transferring the determined one or more files to the cache locally accessible by the client computing device;

determining whether the mounted snapshot is accessible;

in response to a determination that the mounted snapshot is not accessible:

selectively deleting, based on the behavior model, one or more of the files stored in the cache locally accessible by the client computing device; and in response to a determination that the mounted snapshot is accessible:

continuously monitor user interactions with the file system of the mounted snapshot, and updating the one or more files of the cache locally accessible by the client computing device based on the monitored user interactions.

16. The non-transitory, computer-readable media of claim 15, wherein the plurality of operations further comprises:

accessing a file of the one or more files of the mounted snapshot;

determining whether the accessed file is already stored in the cache locally accessible by the client computing device; and transferring the accessed file to the cache locally accessible by the client computing device based on a determination that the accessed file is not already stored in the cache.

17. The non-transitory, computer-readable media of claim 15, wherein the plurality of operations further comprises:

monitoring user interactions of files of the user of the client computing device; and updating the behavior model based on the monitored user interactions.

18. The non-transitory, computer-readable media of claim 15, wherein the plurality of operations further comprises:

determining an available space in the cache locally accessible by the client computing device; and wherein selectively deleting the one or more files stored in the cache is further based on the determined available space.

19. The non-transitory, computer-readable media of claim 15, wherein the plurality of operations further comprises:

determining whether an operation performed by the client computing device is a write operation on a file of the one or more files of the mounted snapshot; and based on a determination that the operation is a write operation:

performing the write operation on the file of the one or more files of the mounted snapshot; and synchronizing the write operation with a cached copy of the file in the cache locally accessible by the client computing device.

20. The non-transitory, computer-readable media of claim 15, wherein the plurality of operations further comprises:

determining that connectivity to the mounted snapshot has been severed; and in response to the determination that the connectivity to the mounted snapshot has been severed, redirecting operations on the file of the one or more files of the mounted snapshot to a cache copy of the file stored in the cache locally accessible by the client computing device.

* * * * *